(12) United States Patent
Ryu et al.

(10) Patent No.: US 12,372,708 B2
(45) Date of Patent: Jul. 29, 2025

(54) WAVEGUIDE AND AUGMENTED REALITY DEVICE EMPLOYING THE SAME

(71) Applicant: SAMSUNG ELECTRONICS CO., LTD., Suwon-si (KR)

(72) Inventors: Jaeyeol Ryu, Suwon-si (KR); Jeonggeun Yun, Suwon-si (KR); Kyusub Kwak, Suwon-si (KR); Youngmo Jeong, Suwon-si (KR); Myungjo Choi, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 246 days.

(21) Appl. No.: 17/962,176

(22) Filed: Oct. 7, 2022

(65) Prior Publication Data
US 2023/0114190 A1 Apr. 13, 2023

Related U.S. Application Data

(63) Continuation of application No. PCT/KR2022/015143, filed on Oct. 7, 2022.

(30) Foreign Application Priority Data

Oct. 8, 2021 (KR) .................. 10-2021-0134459

(51) Int. Cl.
*G02B 27/01* (2006.01)
*F21V 8/00* (2006.01)

(52) U.S. Cl.
CPC .......... *G02B 6/0055* (2013.01); *G02B 6/0016* (2013.01); *G02B 27/0172* (2013.01);
(Continued)

(58) Field of Classification Search
CPC ........ G02B 27/0176; G02B 2027/0152; G02B 2027/0178
See application file for complete search history.

(56) References Cited

U.S. PATENT DOCUMENTS

9,753,432 B2 * 9/2017 Pyun .................. G03H 1/16
10,073,278 B2 9/2018 Vallius
(Continued)

FOREIGN PATENT DOCUMENTS

CN 108107576 A 6/2018
CN 111308717 A 6/2020
(Continued)

OTHER PUBLICATIONS

Communication dated Jan. 18, 2023, issued by the International Searching Authority in counterpart International Application No. PCT/KR2022/015143 (PCT/ISA/220, PCT/ISA/210, and PCT/ISA/237).

*Primary Examiner* — Rhonda S Peace
(74) *Attorney, Agent, or Firm* — Sughrue Mion, PLLC

(57) ABSTRACT

A waveguide and an augmented reality (AR) device employing the waveguide are disclosed. The waveguide includes a waveguide body, an input-coupling element inputting a light into the waveguide body, a reflective element disposed at one side of the waveguide body and again inputting a light that is not input into the waveguide body or is transmitted through the waveguide body into the waveguide body, and an output-coupling element outputting a light propagating inside the waveguide body to an outside.

10 Claims, 22 Drawing Sheets

(52) U.S. Cl.
CPC .. *G02B 27/0176* (2013.01); *G02B 2027/0152* (2013.01); *G02B 2027/0178* (2013.01)

(56) References Cited

U.S. PATENT DOCUMENTS

| | | | |
|---|---|---|---|
| 10,379,358 B2 | 8/2019 | Olkkonen et al. | |
| 10,690,851 B2 * | 6/2020 | Waldern | G02B 5/3016 |
| 10,795,156 B2 | 10/2020 | Marshall | |
| 10,859,437 B2 * | 12/2020 | Scholtz | G01J 3/0218 |
| 10,871,649 B2 | 12/2020 | Simmonds | |
| 11,650,423 B2 * | 5/2023 | Messer | G02B 5/1866 |
| | | | 359/630 |
| 12,050,332 B2 * | 7/2024 | Schultz | G02B 27/0172 |
| 2017/0219841 A1 * | 8/2017 | Popovich | G02B 6/0016 |
| 2018/0120559 A1 | 5/2018 | Yeoh et al. | |
| 2019/0121126 A1 * | 4/2019 | Simmonds | G02B 27/0081 |
| 2019/0162963 A1 | 5/2019 | Leighton et al. | |
| 2019/0187472 A1 | 6/2019 | Choi et al. | |
| 2020/0400955 A1 * | 12/2020 | Messer | G06F 3/017 |
| 2021/0088791 A1 | 3/2021 | Olkkonen et al. | |
| 2021/0109347 A1 | 4/2021 | Blomstedt et al. | |
| 2021/0231854 A1 * | 7/2021 | Schultz | G02B 27/0172 |
| 2021/0318481 A1 | 10/2021 | Häussler | |
| 2023/0114190 A1 * | 4/2023 | Ryu | G02B 27/0081 |
| | | | 385/37 |
| 2024/0248312 A1 * | 7/2024 | Schultz | G02F 1/133531 |

FOREIGN PATENT DOCUMENTS

| | | |
|---|---|---|
| CN | 214335372 U | 10/2021 |
| KR | 10-2019-0010605 A | 1/2019 |
| KR | 10-2019-0066075 A | 6/2019 |
| KR | 10-2019-0072838 A | 6/2019 |
| KR | 10-2020-0104316 A | 9/2020 |
| KR | 10-2020-0136371 A | 12/2020 |
| WO | 2019/122521 A1 | 6/2019 |
| WO | 2020/038790 A1 | 2/2020 |

* cited by examiner

WAVEGUIDE AND AUGMENTED REALITY DEVICE EMPLOYING THE SAME

CROSS-REFERENCE TO RELATED APPLICATIONS

This application is a Continuation Application of International Application PCT/KR2022/015143 filed on Oct. 7, 2022, which claims benefit of Korean Patent Application No. 10-2021-0134459 filed on Oct. 8, 2021 at the Korean Intellectual Property Office, the disclosures of which are incorporated herein in their entireties by reference.

TECHNICAL FIELD

The disclosure relates to a waveguide with increased system efficiency and an augmented reality device employing the waveguide.

BACKGROUND ART

An augmented reality device is a device capable of viewing augmented reality (AR), and, for example, includes AR glasses. An image optical system of an AR device includes an image generating device for generating an image, and a waveguide for sending the generated image to eyes. Such an AR device has a wide viewing angle and high quality images, and the device itself is required to be lightweight and miniaturized.

Recently, in AR devices such as AR glasses, waveguide-based optical systems are being researched and developed. A waveguide of the related art uses freeform reflection or multimirror reflection to input light into the waveguide, or uses an input-coupling diffractive element such as a diffraction optical element or a holographic optical element to input light into the waveguide. When freeform reflection or multimirror reflection of the related art is used, the waveguide may have a simple structure and a high light transmission efficiency, but the viewing angle is limited, and it is difficult to make the waveguide thin. When the input-coupling diffractive element of the related art is used, it is relatively easy to make the waveguide thin, but only a first-order diffracted light is used in the input-coupling diffractive element, which causes a low light transmission efficiency.

DESCRIPTION OF EMBODIMENTS

Technical Problem

Provided are a waveguide that has reduced loss occurred in an input-coupling element and an augmented reality (AR) device employing the waveguide.

Provided are a waveguide having a thin thickness and a sufficient viewing angle and an AR device employing the waveguide.

The technical problems to be solved are not limited to the technical problems as described above, and other technical problems may exist.

Solution to Problem

According to an embodiment of the disclosure, a waveguide includes a waveguide body including a first side on which a light is incident and a second side opposite to the first side, an input-coupling element inputting one portion of the light into the waveguide body, a reflective element disposed at the second side of the waveguide body and again inputting another portion of the light into the waveguide body, and an output-coupling element outputting a light propagating in the waveguide body to an outside.

The input-coupling element may be disposed between the second side of the waveguide body and the reflective element, the reflective element may further reflect a zero order diffraction light generated by the input-coupling element to the input-coupling element, and the input-coupling element may further diffract the zero order diffraction light reflected by the reflective element and again input the zero order diffraction light into the waveguide body.

The input-coupling element may be disposed at the first side of the waveguide body, the reflective element may further reflect a zero order diffraction light generated by the input-coupling element to the waveguide, and the input-coupling element may further diffract the zero order diffraction light reflected by the reflective element and passing through the waveguide body and again input the zero order diffraction light into the waveguide body.

The input-coupling element may be disposed inside the waveguide body, the reflective element may further reflect a zero order diffraction light generated by the input-coupling element to the waveguide, and the input-coupling element may further diffract the zero order diffraction light reflected by the reflective element.

The waveguide body may be a single-layer waveguide.

The waveguide body may include a plurality of waveguide layers, the input-coupling element may include sub-input coupling elements a number of the sub-input cooling elements being equal to or greater than a number of the plurality of waveguide layers, and one of the sub-input coupling elements may be disposed at any one of the first side and the second side, and remaining ones of the sub-input coupling elements may be disposed between the plurality of waveguide layers.

The reflective element may include any one selected from the group consisting of a metal, a dielectric, a polymer, a polarization-dependent element, a meta element, a hologram, and a dichroic mirror.

The reflective element may be attached to, coated on, or spaced apart from the second side of the waveguide body.

The input-coupling element may include a diffractive element or a meta element.

The output-coupling element may include a diffractive element or a meta element.

The waveguide may further include an expanding element expanding the light propagating in the waveguide body.

According to another aspect of the disclosure, an augmented reality (AR) device includes a display engine configured to emit a light of an image, and a waveguide including a waveguide body including a first side on which the light is incident and a second side opposite to the first side, an input-coupling element inputting one portion of the light into the waveguide body, a reflective element disposed at the second side of the waveguide body and again inputting another portion of the light into the waveguide body, and an output-coupling element outputting a light propagating in the waveguide body to an outside, wherein the display engine is disposed opposite to the first side of the waveguide, and the waveguide guides the light emitted from the display engine to a target region, the target region being a user's eye motion box (EMB).

According to another aspect of the disclosure, augmented reality (AR) glasses includes a left eye element and a right eye element, wherein each of the left eye element and the right eye element includes a display engine configured to emit a light of an image, and a waveguide including a waveguide body including a first side on which a light is incident and a second side opposite to the first side, an input-coupling element inputting the light into the waveguide body, a reflective element positioned on or at the second side of the waveguide body and again inputting a light that is not input into the waveguide body or is transmitted through the waveguide body into the waveguide body, and an output-coupling element outputting a light propagating in the waveguide body to an outside, wherein the waveguide is disposed in each of the left eye element and the right eye element so that an output-coupling element outputting the light emitted from the display engine is disposed opposite to a region including a user's eye.

Advantageous Effects of Disclosure

The disclosed waveguide and the augmented reality (AR) device employing the same may reduce the loss occurred in the input-coupling element.

The disclosed waveguide and the AR device employing the same may improve the system efficiency.

The disclosed waveguide may reduce the thickness of the AR device, thereby providing a lightweight AR device.

MODE OF DISCLOSURE

Figure 1:
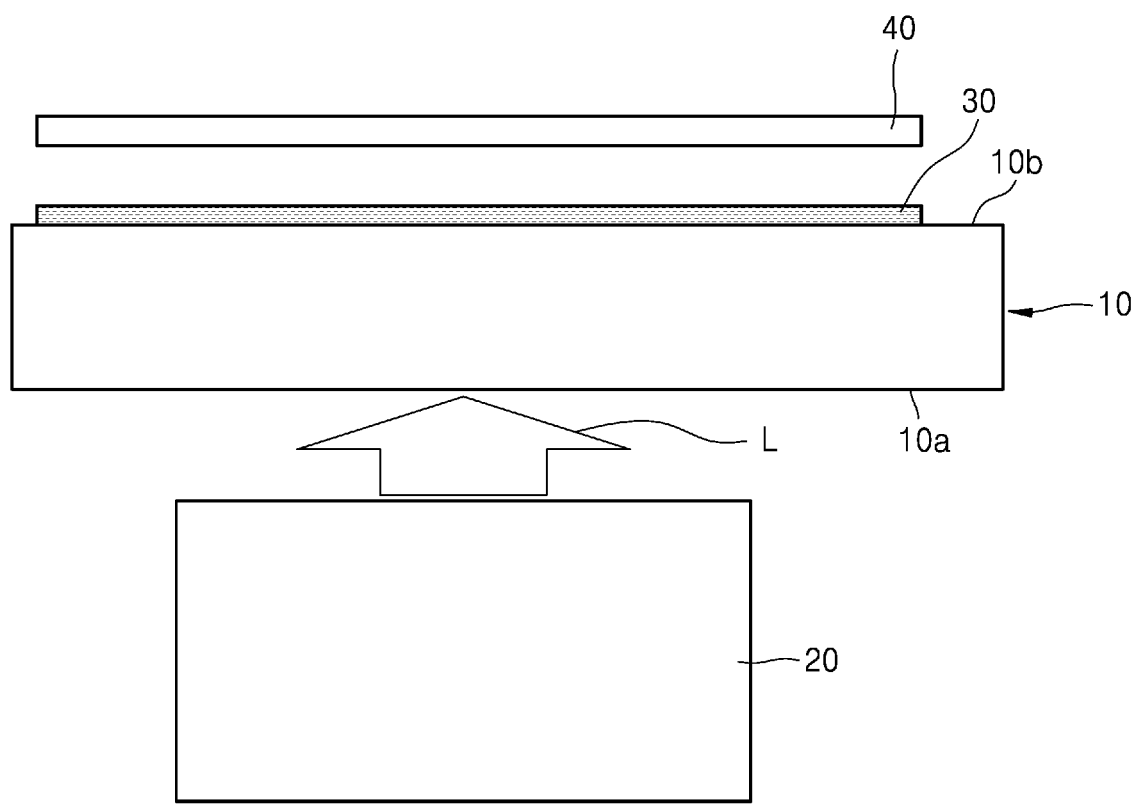
FIG. 1 schematically illustrates a waveguide according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, an embodiment of the disclosure will be described in detail with reference to the attached drawings to allow those of ordinary skill in the art to easily carry out the embodiment of the disclosure. However, the disclosure may be implemented in various forms, and are not limited to the embodiment of the disclosure described herein. To clearly describe the disclosure, parts that are not associated with the description have been omitted from the drawings, and throughout the specification, identical reference numerals refer to identical parts.

Although terms used in an embodiment of the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

The singular expression includes the plural expression unless the context clearly dictates otherwise. Also, when a part "includes" a certain component, it means that the part may further include other components, rather than excluding other components, unless otherwise stated.

Hereinafter, the disclosure will be described in detail with reference to the accompanying drawings.

FIG. 1 schematically illustrates a waveguide 10 according to an embodiment of the disclosure.

Referring to FIG. 1, the waveguide 10 is a plate-shaped member including a first side 10a and a second side 10b opposite to the first side 10a. The first side 10a and the second side 10b refer to both wide sides of the plate-shaped member. Although the waveguide 10 is illustrated as a flat plate-shaped member in FIG. 1, the waveguide 10 may be a plate-shaped member having a curved surface. The waveguide 10 may be formed of a transparent material in a visible light band, but is not limited thereto.

A light L is to be incident on the first side 10a of the waveguide 10. A display engine 20 is disposed toward or on the first side 10a of the waveguide 10 so that a light of a virtual object may be incident thereon. The display engine 20 is an apparatus that emits a light carrying a virtual object at a certain viewing angle. For example, the display engine 20 may be a projector projecting a light generated by an image panel or a projector scanning a modulated light, but is not limited thereto. The first side 10a of the waveguide 10 may be coated with a filter (not shown) through which only a wavelength band and/or polarization of the light L exited from the display engine 20 passes or an anti-reflection layer (not shown).

An input-coupling element 30 is disposed on the second side 10b of the waveguide 10.

The input-coupling element 30 may be a diffractive element or a meta element. The diffractive element may include, for example, a diffractive optical element (DOE), a holographic optical element (HOE), a volume holographic optical element (VHOE), or a surface relief lattice (SRG), but is not limited thereto. The meta element is an element having a metasurface structured in a pattern in which an incident light is smaller than a wavelength band (i.e., a subwavelength), for example, a metalattice or metalens having the pattern in which the incident light is smaller than the wavelength band, but is not limited thereto.

In an embodiment of the disclosure, the input-coupling element 30 may be attached to or coated on the second side 10b of the waveguide 10.

In an embodiment of the disclosure, the input-coupling element 30 may be etched in the second side 10b of the waveguide 10.

A reflective element 40 is disposed outside the input-coupling element 30. That is, the input-coupling element 30 and the reflective element 40 are sequentially disposed from the second side 10b of the waveguide 10. In other words, the input-coupling element 30 is disposed between the second side 10b of the waveguide 10 and the reflective element 40.

The reflective element 40 may be a metal, a dielectric, a polymer, a polarization-dependent element, a meta element, a hologram, or a dichroic mirror, but is not limited thereto.

The reflective element 40 is spaced apart from the input-coupling element 30 in FIG. 1, but is not limited thereto. The reflective element 40 may be spaced apart from the waveguide 10 or the input-coupling element 30 or attached to or coated on the input-coupling element 30, as shown in FIGS. 2 and 3.

In FIG. 1, the reflective element 40 is exactly opposite to the input-coupling element 30, but is not limited thereto. For example, the reflective element 40 may be slightly obliquely disposed to be opposite to the input-coupling element 30. The area of the reflective element 40 may be equal to or greater than the area of the input-coupling element 30, but is not limited thereto. As will be described below, because the waveguide 10 may be used in an optical system of an augmented reality (AR) device, the region of the reflective element 40 may be limited so as not to invade a region of the output-coupling element (see 50 in FIG. 21) so that a real-world scene may be seen in a see-through manner. Although not shown in the drawings, an expanding element or an output-coupling element (50 in FIG. 21) may be provided in the waveguide 10.

Next, an operation of the waveguide 10 of the embodiment of the disclosure will be described.

Figure 2:
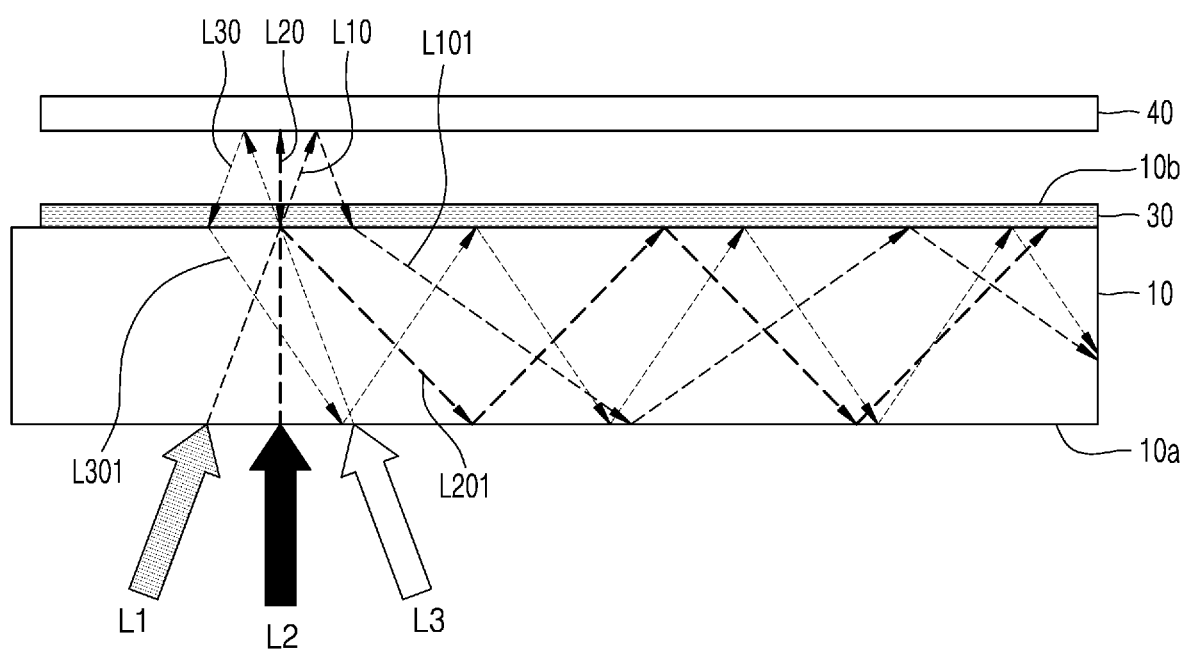
FIG. 2 is a diagram illustrating an operation of the waveguide of FIG. 1.
Figure 3:
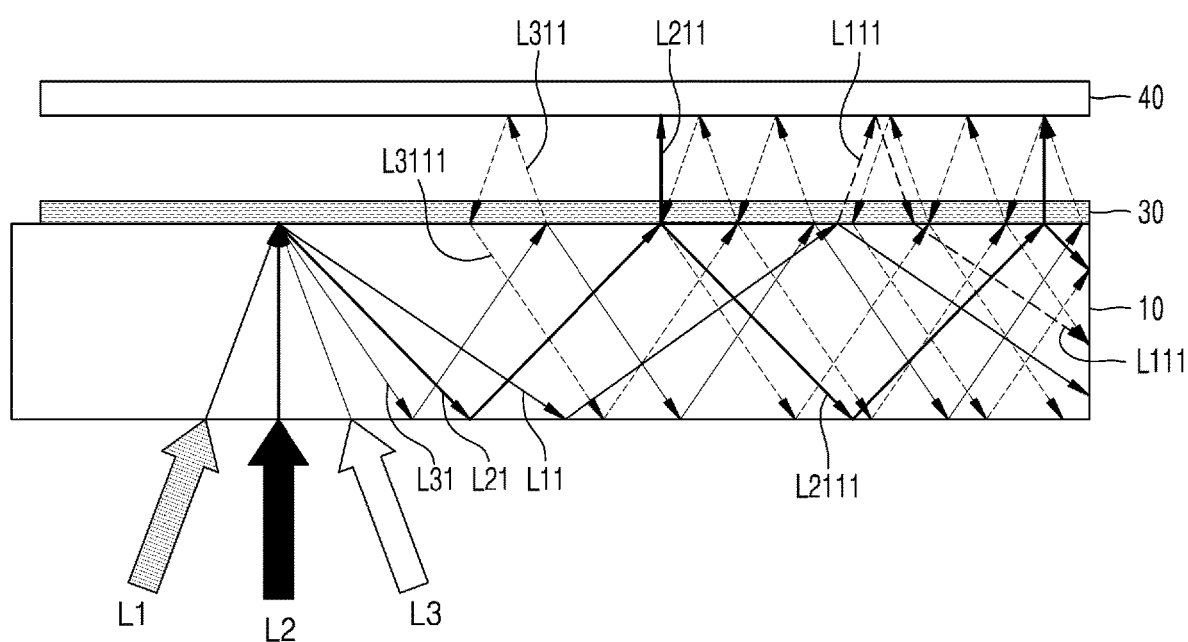
FIG. 3 is a diagram illustrating an operation of the waveguide of FIG. 1.

FIGS. 2 and 3 are diagrams illustrating operations of the waveguide 10 of FIG. 1.

Referring to FIGS. 2 and 3, first to third lights L1, L2, and L3 may be incident on the waveguide 10 at various incidence angles. For example, the first light L1 may be a light incident from one outermost side of a viewing angle of the display engine 20, the second light L2 may be a light incident near the center of the viewing angle of the display engine 20, and the third light L3 may be a light incident from the other outermost side of the viewing angle of the display engine 20. The first light L1 is indicated by a dotted or solid line of a medium thickness, the second light L2 is indicated by a dotted or solid line of a thick thickness, and the third light L3 is indicated by a dotted or solid line of a thin thickness. In FIGS. 2 and 3, refractions of the first to third lights L1, L2, and L3 at the boundary of a medium (i.e., the first side 10a of the waveguide 10) are not indicated for convenience.

FIG. 2 illustrates a path of a zero order diffraction light generated in the input-coupling element 30. Incidence angles of the first to third lights L1, L2, and L3 are angles that do not satisfy a total reflection condition in the waveguide 10 after being refracted at the boundary of the medium. In addition, the incidence angles of the first to third lights L1, L2, and L3 are angles satisfying a condition that a first order diffraction light diffracted by the input-coupling element 30 is totally internally reflected. Furthermore, the incidence angles of the first to third lights L1, L2, and L3 further satisfy a constraint in which the first to third lights L1, L2, and L3 is exited from the waveguide 10 into a user's eye box.

The first to third lights L1, L2, and L3 are incident on the first side 10a of the waveguide 10, and then are directed toward the second side 10b. The input-coupling element 30 on the second side 10b of the waveguide 10 diffracts the first to third lights L1, L2, and L3 to generate a zero order diffraction light, a first order diffraction light, etc.

Among the zero order diffraction light, the first order diffraction light, etc. diffracted by the input-coupling element 30, zero order diffraction lights L10, L20, L30 are lights that travel as they are without bending their traveling directions in the input-coupling element 30. Accordingly, the zero order diffraction lights L10, L20, and L30 generated by the input-coupling element 30 are directed toward the reflective element 40, reflected by the reflective element 40, and incident back to the input-coupling element 30. The input-coupling element 30 diffracts the zero order diffraction light L10, L20, and L30 reflected by the reflective element 40 back to the zero order diffraction light, the first order diffraction light, etc. Among the zero order diffraction lights L10, L20, and L30 reflected by the reflective element 40, the zero order light diffracted from the input-coupling element 30 passes through the waveguide 10 because its traveling direction is not bent. However, among the zero order diffraction lights L10, L20, and L30 reflected by the reflective element 40, first order diffraction lights L101, L201, and L301 diffracted by the input-coupling element 30 propagate in the waveguide 10 because the total reflection condition of the waveguide 10 is satisfied. That is, the zero order diffraction light L10, L20, and L30 firstly generated by the input-coupling element 30 may be again input back to the input-coupling element 30 and secondarily diffracted. The first order diffraction lights L101, L201, and L301 are totally internally reflected and propagate in the waveguide 10, and thus, loss of the amount of light may be reduced.

FIG. 3 illustrates a path of a first order diffraction light generated in the input-coupling element 30. Referring to FIG. 3, the first to third lights L1, L2, and L3 are incident on the first side 10a of the waveguide 10, and then diffracted by the input-coupling element 30 on the second side 10b of the waveguide 10 to form a zero order diffraction light, a first order diffraction light, etc. At this time, each of the first order diffraction lights L11, L21, and L31 is reflected and diffracted by the input-coupling element 30 and again input to the waveguide 10. The first order diffraction light L11, L21, and L31 may be totally internally reflected and propagate in the waveguide 10. However, in a total reflection process, the first order diffraction lights L11, L21, and L31 may be diffracted once again in the input-coupling element 30 on the second side 10b of the waveguide 10. Among the diffraction lights diffracted once again (i.e., secondarily) by the input-coupling element 30, the first order diffraction lights L111, L211, and L311 escape from the waveguide 10. However, first order diffraction lights L111, L211, and L311 escaped from the waveguide 10 may be reflected back by the reflective element 40 and again input to the input-coupling element 30, and diffracted by the input-coupling element 30 twice again (i.e., thirdly). Among lights diffracted twice again (i.e., thirdly), a first order diffraction light may satisfy the total reflection condition of the waveguide 10 and propagate in the waveguide 10, and thus, loss of the amount of light may be reduced.

In k-space, $K_i$ denotes components of the first to third lights L1, L2, and L3) in a direction parallel to the waveguide 10, $K_G$ denotes component of a k-vector representing the input-coupling element 30 in a direction parallel to the waveguide 10, then "+1"th order diffraction lights L11, L21, and L31 in a first order diffraction may be expressed as $K_i+K_G$. A lattice vector of the input-coupling element 30 may or may not include a component in a direction perpendicular to the waveguide 10. Here, the direction parallel to the waveguide 10 (hereinafter, briefly referred to as a parallel direction) means a direction parallel to the first side 10a (or the second side 10b) of the waveguide 10, and the direction perpendicular to the waveguide 10 (hereinafter, briefly referred to as a vertical direction) means a direction perpendicular to the first side 10a (or the second side 10b) of the waveguide 10.

Referring back to FIG. 2, when the zero order diffraction lights L10, L20, and L30 are reflected by the reflective element 40, only the component of the k vector of the zero order diffraction light L10, L20, and L30 in the vertical direction is inverse, and a component of the k vector in a horizontal direction is maintained. Accordingly, the component of the "+1"th order diffraction lights L101, L201, and L301 in the parallel direction reflected in the reflective element 40 and then diffracted by the input-coupling element 30 has $K_i+K_G$.

On the other hand, referring back to FIG. 3, the "+1"th order diffraction lights L11, L21, and L31 in the input-coupling element 30 are diffracted once again in the input-coupling element 30 after total reflection, resulting in "−1"th order diffraction lights L111, L211, and L311, respectively. At this time, the "−1"th order diffraction lights L111, L211, and L311 have a component of $K_i+K_G-K_G=K_i$ in the horizontal direction. The "−1"th order diffraction lights L111, L211, and L311 are incident back into the waveguide 10 through reflection from the reflective element 40 and diffraction from the input-coupling element 30, and thus the component of the "+1"th diffraction light in the parallel direction among the lights diffracted twice again (i.e., thirdly) has $K_i+K_G$.

As described above, because all of lights guided by the waveguide 10 has the component of $K_i+K_G$ in the parallel direction, the efficiency of a virtual image may be increased without image doubling.

Figure 4:
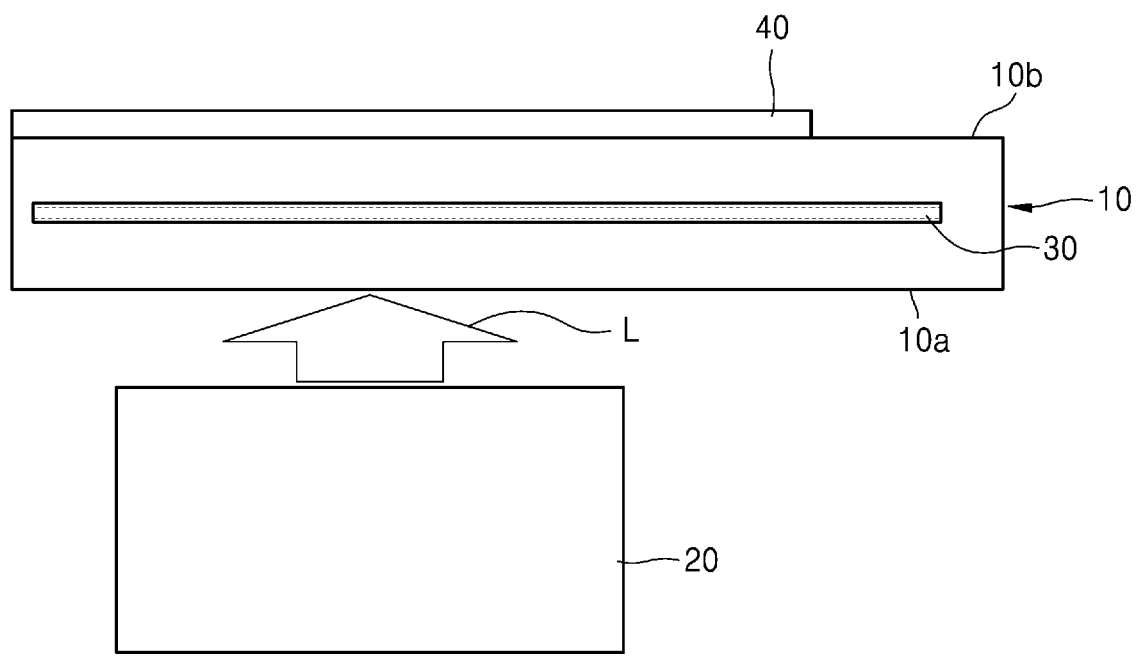
FIG. 4 schematically illustrates a waveguide according to an embodiment of the disclosure.
Figure 5:
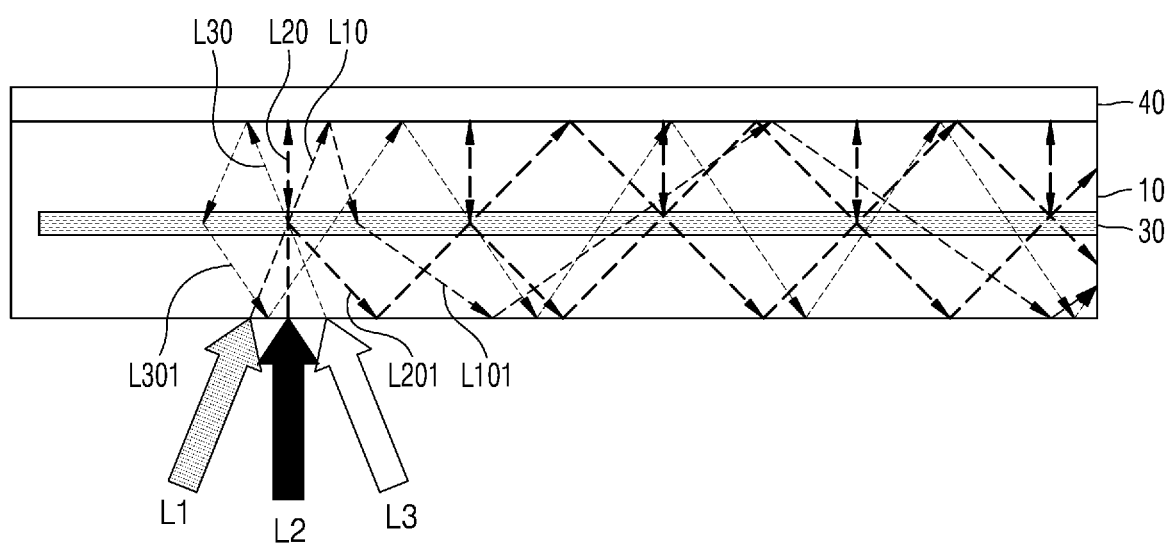
FIG. 5 is a diagram illustrating an operation of the waveguide of FIG. 4.
Figure 6:
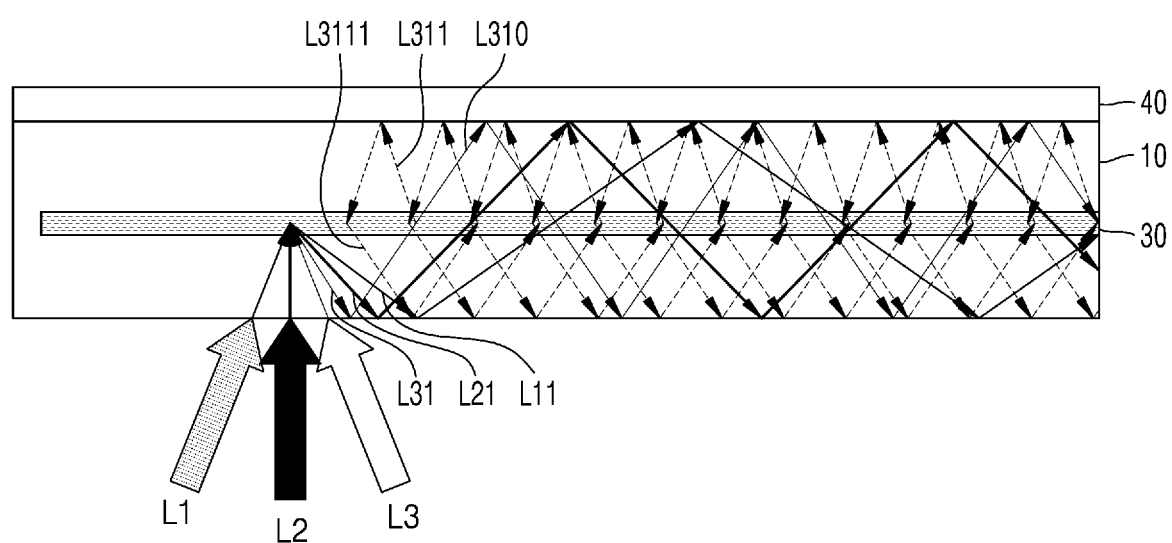
FIG. 6 is a diagram illustrating an operation of the waveguide of FIG. 4.

FIG. 4 schematically illustrates the waveguide 10 according to an embodiment of the disclosure, and FIGS. 5 and 6 are diagrams illustrating operations of the waveguide 10 of FIG. 4. In FIGS. 5 and 6, refractions of the first to third lights L1, L2, and L3 at the boundary of the medium (i.e., the first side 10a of the waveguide 10) are not indicated for convenience. The embodiment of the disclosure is substantially the same as the embodiment described with reference to FIGS. 1 to 3, except that the input-coupling element 30 is disposed inside the waveguide 10, and thus redundant descriptions are omitted, and differences are mainly described.

Referring to FIG. 4, the input-coupling element 30 may be disposed inside the waveguide 10. The reflective element 40 is disposed on the second side 10b of the waveguide 10. In FIG. 4, the reflective element 40 is attached to the second side 10b of the waveguide 10, but the reflective element 40 may be spaced apart from the second side 10b of the waveguide 10. Although not shown in the drawings, an expanding element or an output-coupling element (50 in FIG. 21) may be provided inside or on the surface of the waveguide 10.

FIG. 5 illustrates a path of a zero order diffraction light generated in the input-coupling element 30. Referring to FIG. 5, the first to third lights L1, L2, and L3 are incident on the first side 10a of the waveguide 10 and then meet the input-coupling element 30. The input-coupling element 30 diffracts the first to third lights L1, L2, and L3 to form a zero order diffraction light, a first order diffraction light, etc. Among the zero order diffraction light, the first order diffraction light, etc. diffracted by the input-coupling element 30, zero order diffraction lights L10, L20, L30 are lights that travel as they are without bending their traveling directions in the input-coupling element 30. Accordingly, the zero order diffraction lights L10, L20, and L30 generated by the input-coupling element 30 are directed toward the second side 10b of the waveguide 10. The zero order diffraction lights L10, L20, and L30 escape from the second side 10b of the waveguide 10 because the total reflection condition of the waveguide 10 is not satisfied. However, because the reflective element 40 is on the second side 10b of the waveguide 10, the zero order diffraction lights L10, L20, and L30 are reflected by the reflective element 40 and again input back to the waveguide 10. Even when the reflective element 40 is attached to or spaced apart from the second side 10b of the waveguide 10, paths of the zero order diffraction lights L10, L20, and L30 are substantially the same.

The input-coupling element 30 diffracts back the zero order diffraction lights L10, L20, L30 which are again incident into the waveguide 10 to the zero order diffraction light, the first order diffraction light, etc. Among the zero order diffraction lights L10, L20, and L30 reflected by the reflective element 40, the zero order light diffracted from the input-coupling element 30 passes through the waveguide 10 because its traveling direction is not bent. However, among the zero order diffraction lights L10, L20, and L30 reflected by the reflective element 40, first order diffraction lights L101, L201, and L301 from the input-coupling element 30 propagate in the waveguide 10 because the total reflection condition of the waveguide 10 is satisfied. That is, the zero order diffraction light L10, L20, and L30 firstly generated by the input-coupling element 30 may be again input back to the input-coupling element 30 and secondarily diffracted. The first order diffraction lights L101, L201, and L301 are totally internally reflected and propagate in the waveguide 10, and thus, loss of the amount of light may be reduced.

FIG. 6 illustrates a path of a first order diffraction light generated in the input-coupling element 30. Referring to FIG. 6, the first to third lights L1, L2, and L3 are incident on the first side 10a of the waveguide 10, and then diffracted by the input-coupling element 30 to form a zero order diffraction light, a first order diffraction light, etc. At this time, each of the first order diffraction lights L11, L21, and L31 is reflected and diffracted by the input-coupling element 30 and input to the waveguide 10. The first order diffraction light L11, L21, and L31 may be totally internally reflected and propagate in the waveguide 10. However, in a total reflection process, the first order diffraction lights L11, L21, and L31 may be diffracted once again in the input-coupling element 30. For example, with respect to only the third light L3, the zero order diffraction light L310 among the diffraction lights diffracted once again (i.e., secondarily) by the input-coupling element 30 maintains total reflection propagation, but the first order diffraction light L311 does not satisfy the total reflection condition of the waveguide 10. However, because the reflective element 40 is positioned on or at the second side 10*b* of the waveguide 10, the first diffraction light L311 is again incident back into the waveguide 10 by the reflective element 40, and diffracted by the input-coupling element 30 twice again (i.e., thirdly). Among the lights diffracted twice again (i.e., thirdly), the first order diffraction light L3111 may satisfy the total reflection condition of the waveguide 10 and propagate in the waveguide 10, and thus, loss of the amount of light may be reduced. The paths of the first and second lights L1 and L2 are also substantially the same as the path of the third light L3, and thus a description thereof is omitted. In addition, although not shown in FIG. 6, in the first order diffraction of the first to third lights L1, L2, and L3, diffraction components passing through the input-coupling element 30 may also suppress loss of the amount of light by the reflective element 40 in the same manner.

Figure 7:
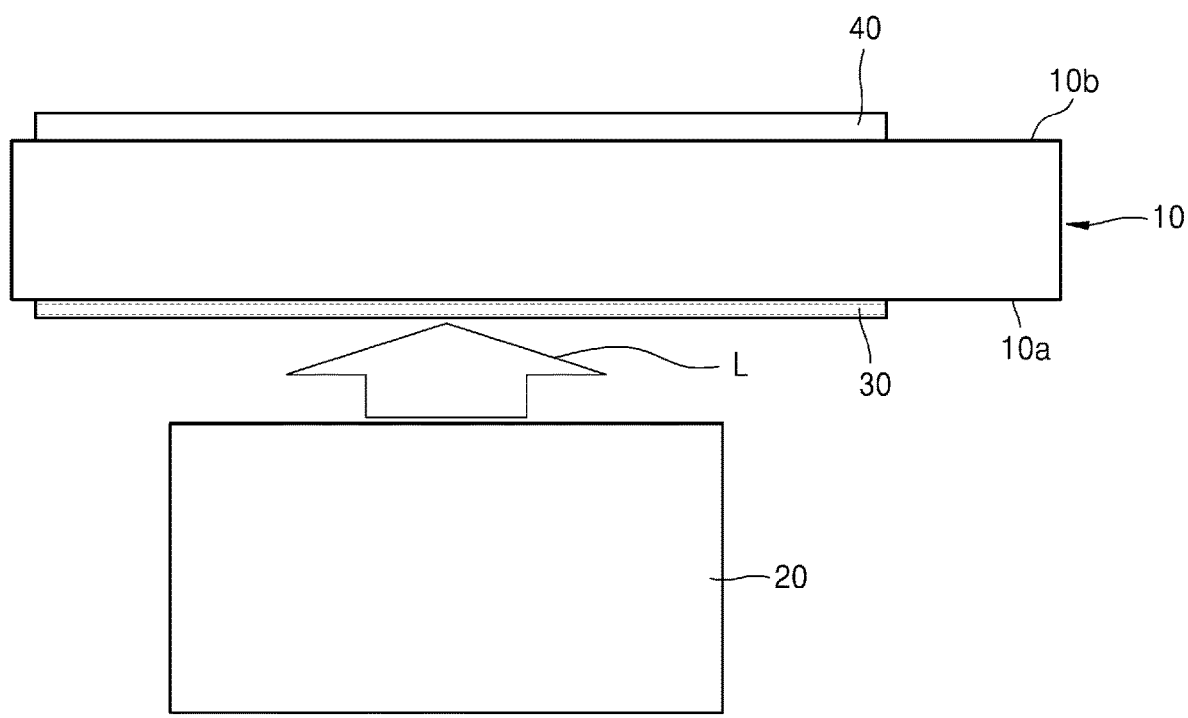
FIG. 7 schematically illustrates a waveguide according to an embodiment of the disclosure.
Figure 8:
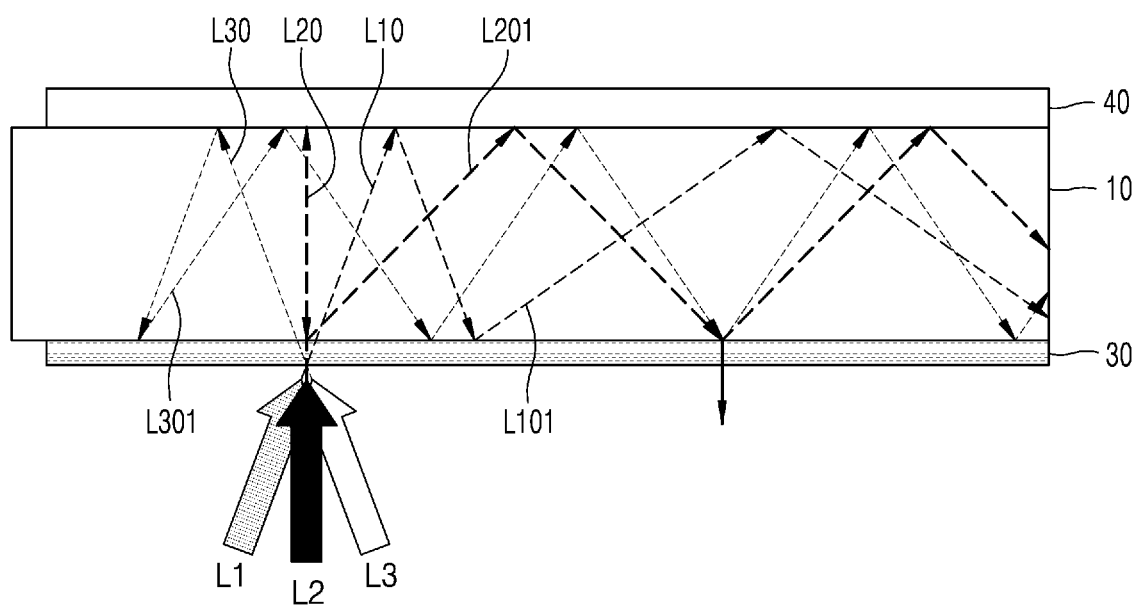
FIG. 8 is a diagram illustrating an operation of the waveguide of FIG. 7.
Figure 9:
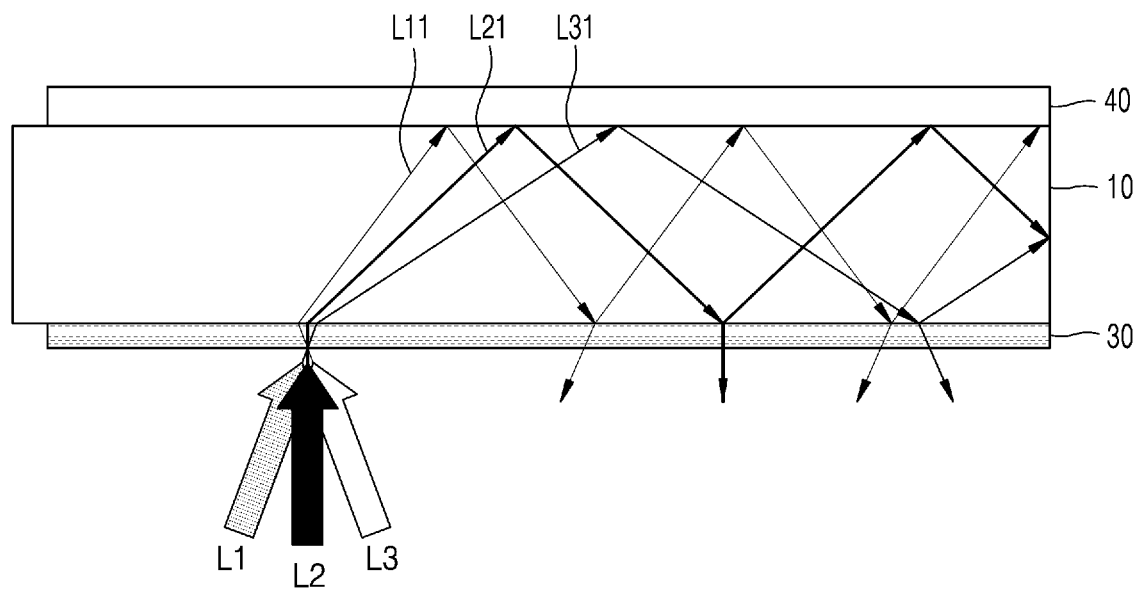
FIG. 9 is a diagram illustrating an operation of the waveguide of FIG. 7.

FIG. 7 schematically illustrates the waveguide 10 according to an embodiment of the disclosure, and FIGS. 8 and 9 are diagrams illustrating the operation of the waveguide 10 of FIG. 7. In FIG. 8, refractions of the first to third lights L1, L2, and L3 at the boundary of a medium (i.e., the first side 10*a* of the waveguide 10) are not indicated for convenience. The embodiment of the disclosure is substantially the same as the embodiment described with reference to FIGS. 1 to 6, except that the input-coupling element 30 is disposed on the first side 10*a* of the waveguide 10, and thus redundant descriptions are omitted, and differences are mainly described.

Referring to FIG. 7, the input-coupling element 30 may be disposed on the first side 10*a* of the waveguide 10. The input-coupling element 30 may be etched in, attached to, or coated on the first side 10*a* of the waveguide 10, but is not limited thereto. The reflective element 40 is disposed on the second side 10*b* of the waveguide 10. In FIG. 7, the reflective element 40 is attached to the second side 10*b* of the waveguide 10, but the reflective element 40 may be spaced apart from the second side 10*b* of the waveguide 10. Although not shown in the drawings, an expanding element or an output-coupling element (50 in FIG. 21) may be provided inside or on the surface of the waveguide 10.

FIG. 8 illustrates a path of a zero order diffraction light generated in the input-coupling element 30. Referring to FIG. 8, the first to third lights L1, L2, and L3 are incident on the input-coupling element 30 positioned on or at the first side 10*a* of the waveguide 10, and the input-coupling element 30 diffracts the first to third lights L1, L2, and L3 to form a zero order diffraction light, a first order diffraction light, etc.

Among the zero order diffraction light, the first order diffraction light, etc. diffracted by the input-coupling element 30, the zero order diffraction lights L10, L20, L30 are lights that travel as they are without bending their traveling directions in the input-coupling element 30. Accordingly, the zero order diffraction lights L10, L20, and L30 generated by the input-coupling element 30 are incident into the waveguide 10, directed toward the reflective element 40 without total reflection, reflected by the reflective element 40, and incident back on the input-coupling element 30. The input-coupling element 30 diffracts back the zero order diffraction lights L10, L20, and L30 reflected by the reflective element 40 to the zero order diffraction light, the first order diffraction light, etc. Among the zero order diffraction lights L10, L20, and L30 reflected by the reflective element 40, the light transmitted from the input-coupling element 30 may be lost. However, among the zero order diffraction lights L10, L20, and L30 reflected by the reflective element 40, first order diffraction lights L101, L201, and L301 from the input-coupling element 30 propagate in the waveguide 10 because the total reflection condition of the waveguide 10 is satisfied. That is, the zero order diffraction light L10, L20, and L30 firstly generated by the input-coupling element 30 may be again input back to the input-coupling element 30 and secondarily diffracted. The first order diffraction lights L101, L201, and L301 are totally internally reflected and propagate in the waveguide 10, and thus, loss of the amount of light may be reduced.

FIG. 9 illustrates a path of a first order diffraction light generated in the input-coupling element 30. Referring to FIG. 9, the first to third lights L1, L2, and L3 are diffracted by the input-coupling element 30 on the first side 10*a* of the waveguide 10 to form a zero order diffraction light, a first order diffraction light, etc. At this time, each of the first order diffraction lights L11, L21, and L31 may be totally internally reflected and propagate in the waveguide 10. However, in a total reflection process, the first order diffraction lights L11, L21, and L31 may be diffracted once again in the input-coupling element 30 on the first side 10*a* of the waveguide 10. Among the lights diffracted twice again (i.e., thirdly), a first order diffraction light may satisfy the total reflection condition of the waveguide 10 and propagate in the waveguide 10, and thus, loss of the amount of light may be reduced.

Figure 10:
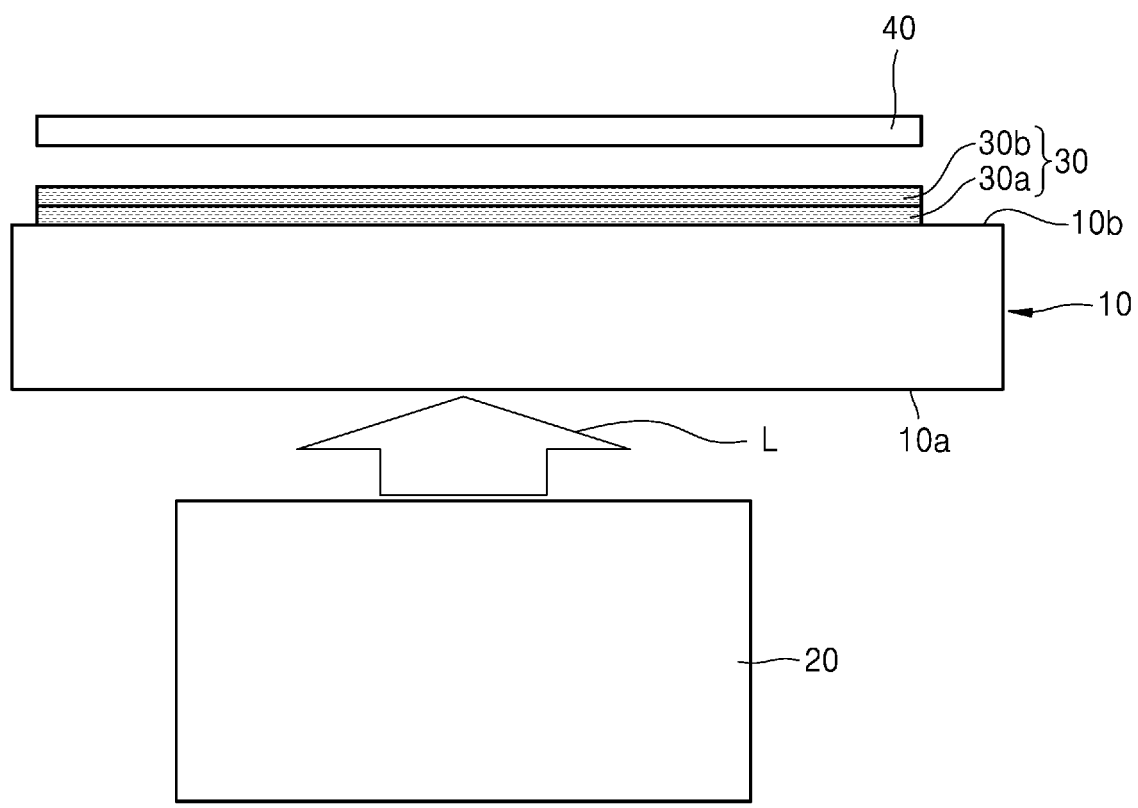
FIG. 10 schematically illustrates a waveguide according to an embodiment of the disclosure.

In the embodiments of the disclosure described above, an example in which the input-coupling element 30 is a single layer has been described, but the input-coupling element 30 may be formed by stacking a plurality of layers having different lattice characteristics. FIG. 10 schematically illustrates a waveguide according to an embodiment of the disclosure. The waveguide is substantially the same as that of the embodiment described with reference to FIG. 1, except that the input-coupling element 30 includes first and second layers 30*a* and 30*b*. The first and second layers 30*a* 30*b* of the input-coupling element 30 may have different lattice characteristics, such as a lattice vector, so as to increase the input efficiency of different wavelengths of light or expand the viewing angle.

Figure 11:
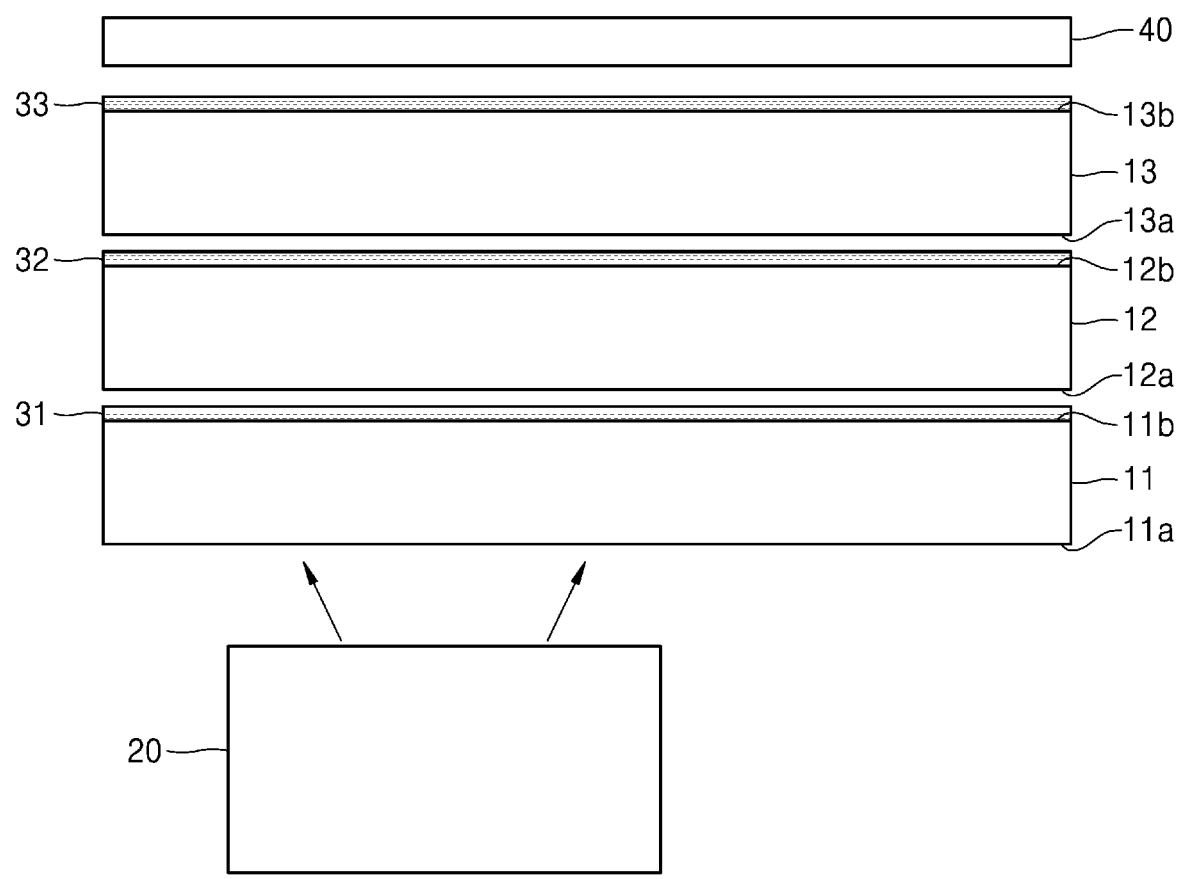
FIG. 11 schematically illustrates a waveguide according to an embodiment of the disclosure.

FIG. 11 schematically illustrates a waveguide according to an embodiment of the disclosure, and FIGS. 12 to 17 are diagrams illustrating operations of the waveguide of FIG. 11. In FIGS. 12 to 17, refractions of the first to third lights L1, L2, and L3 at the boundary of a medium (i.e., first to third waveguide layers 11, 12 and 13 of the waveguide) are not illustrated for convenience. The embodiment of the disclosure is substantially the same as the embodiment described with reference to FIGS. 1 to 3, except that except that the waveguide includes multiple layers and a plurality of input-coupling elements, and thus descriptions of redundant components are omitted, and differences are mainly described.

Referring to FIG. 11, the waveguide includes the first to third waveguide layers 11, 12, and 13. The first to third waveguide layers 11, 12, and 13 may have the same refractive index or different refractive indices. The first to third waveguide layers 11, 12, and 13 may be spaced apart from each other with a gap. Spacers (not shown) may be disposed between the first to third waveguide layers 11, 12, and 13.

The light L is scheduled to be incident on the first side 11*a* of the first waveguide layer 11 of the waveguide. That is, the display engine 20 may be disposed on the first side 11*a* of the first waveguide layer 11 so that the light of a virtual object may be incident thereon.

The input-coupling element may include first to third sub-input coupling elements 31, 32, and 33. The first and second sub-input coupling elements 31 and 32 are positioned between the first to third waveguide layers 11, 12, and 13. In an embodiment of the disclosure, the first sub-input coupling element 31 may be positioned on or at a second side 11*b* opposite to the first side 11*a* of the first waveguide layer 11. In an embodiment of the disclosure, the second sub-input coupling element 32 may be positioned on or at a second side 12*b* of the second waveguide layer 12. The second waveguide layer 12 has a first side 12*a* and the second side 12*b* opposite to each other, and the second side 12*b* is farther from the display engine 20. The third sub-input coupling element 33 may be positioned on or at a second side 13*b* of the third waveguide layer 13. The third waveguide layer 13 has a first side 13*a* and the second side 13*b* opposite to each other, and the second side 13*b* is farther from the display engine 20. The first to third sub-input coupling elements 31, 32, and 33 may be etched in, attached to, or coated on the first to third waveguide layers 11, 12, and 13, respectively, but are not limited thereto. Although not shown in the drawings, an expanding element or an output-coupling element (50 in FIG. 21) may be provided on at least one of the first to third waveguide layers 11, 12, and 13.

In the drawings, the first to third lights L1, L2, and L3 do not mean lights having different wavelengths, but lights having different incidence angles.

The light incident on the waveguide may include light of different wavelengths. In this case, there is substantially no difference except that angles of diffraction lights diffracted by the first to third sub-input coupling elements 31, 32 and 33 are different.

The refractive index or thickness of each of the first to third waveguide layers 11, 12, and 13, a period of lattice of each of the first to third sub-input coupling elements 31, 32, and 33, etc. may vary depending on the wavelength or the viewing angle of the propagating light, the positon of an exit pupil, etc.

The reflective element 40 is positioned on or at one side (i.e., the second side 13*b* of the third waveguide layer 13) of the first to third waveguide layers 11, 12, and 13. The reflective element 40 may be positioned outside the third sub-input coupling element 33. That is, the second side 13*b* of the third waveguide layer 13, the third sub-input coupling element 33, and the reflective element 40 are sequentially disposed.

Figure 12:
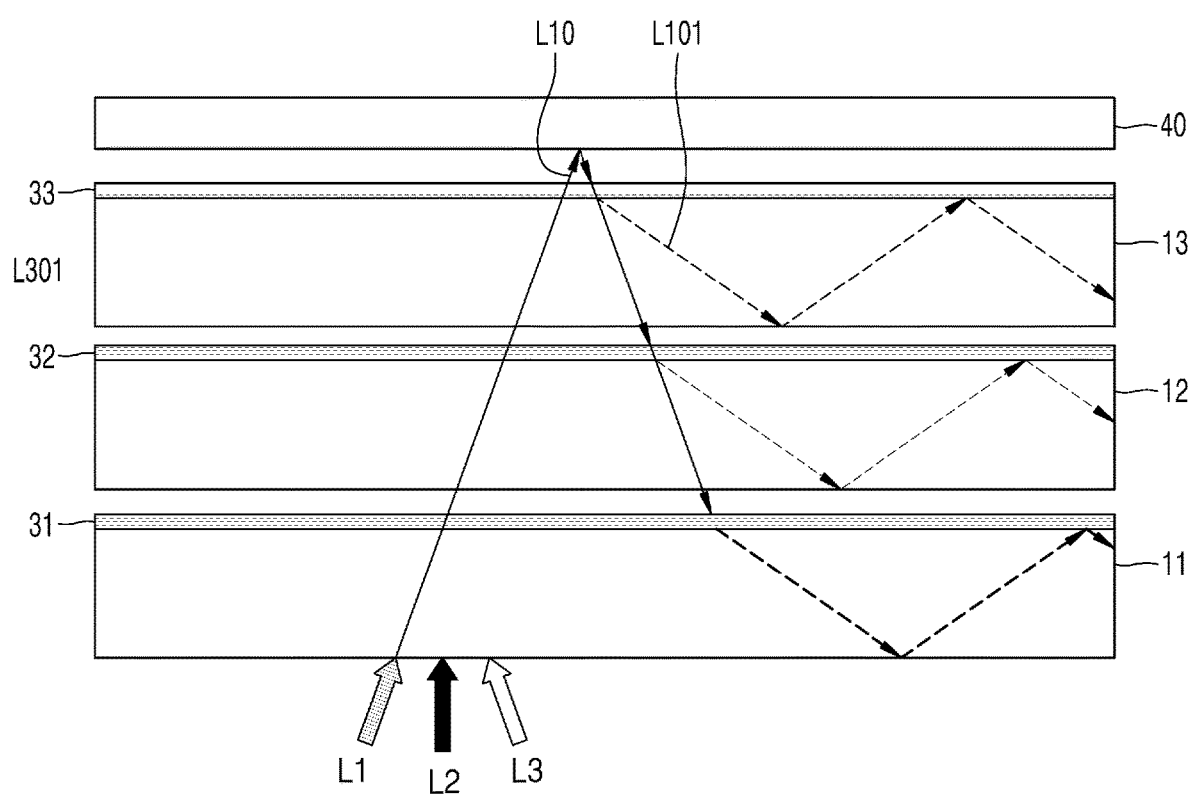
FIG. 12 is a diagram illustrating an operation of the waveguide of FIG. 11.

FIG. 12 illustrates a path of a zero order diffraction light among optical paths of the first light L1. Referring to FIG. 12, the first light L1 is incident on the first waveguide layer 11 and then, diffracted as a zero order diffraction light, a first order diffraction light, etc. by the first sub-input coupling element 31. Among the diffraction lights diffracted by the first sub-input coupling element 31, the zero order diffraction light L10 is light that travels as it is without bending its traveling direction in the first sub-input coupling element 31. Accordingly, the zero order diffraction light L10 generated by the first sub-input coupling element 31 is incident into the second waveguide layer 12 and then is directed toward the second sub-input coupling element 32. The second sub-input coupling element 32 diffracts the zero order diffraction light L10 once again (second order). Among the lights diffracted once again (second order) by the second sub-input coupling element 32, the zero order diffraction light L10 is incident into the third waveguide layer 13 and then, directed toward the third sub-input coupling element 33, and diffracted twice again (third order) by the third sub-input coupling element 33. As a result, among the lights diffracted twice again (third order) by the third sub-input coupling element 33, the zero order diffraction light L10 is directed toward the reflective element 40, is reflected by the reflective element 40, and is incident back on the sub-input coupling element 33.

The third sub-input coupling element 33 diffracts the zero order diffraction light L10 reflected by the reflective element 40 back to the zero order diffraction light, the first order diffraction light, etc. In the zero order diffraction light L10 reflected by the reflective element 40, the first order diffraction light L101 diffracted by the third sub-input coupling element 33 propagates in the third waveguide layer 13 because the total reflection condition of the third waveguide layer 13 is satisfied. In addition, in the zero order diffraction light L10 reflected by the reflective element 40, the zero order diffraction light diffracted by the third sub input-coupling element 33 passes through the third waveguide layer 13 and is directed to the input-coupling element 32, and part of the zero order diffraction light is diffracted back by the second sub-input coupling element 32 propagate in the second waveguide layer 12 because the total reflection condition of the second waveguide layer 12 is satisfied. The zero order diffraction light diffracted by the second sub-input coupling element 32 passes through the second waveguide layer 12 and is directed to the first sub-input coupling element 31, and part of the zero order diffraction light is firstly diffracted back by the first sub-input coupling element 31 and propagates in the first waveguide layer 11 because the total reflection condition of the first waveguide layer 11 is satisfied. As described above, the zero order diffraction light escaped from the third waveguide layer 13 is reflected by the reflective element 40 to have an additional diffraction opportunity, thereby increasing optical efficiency. Furthermore, part of the diffraction light L101 that is additionally diffracted and totally internally reflected is firstly diffracted back by the first to third sub-input coupling elements 31, 32, and 33, and escapes from the first to third waveguide layers 11, 12 and 13. The reflective element 40 inputs again these lights back to the first to third waveguide layers 11, 12, and 13, thereby increasing light efficiency.

Figure 13:
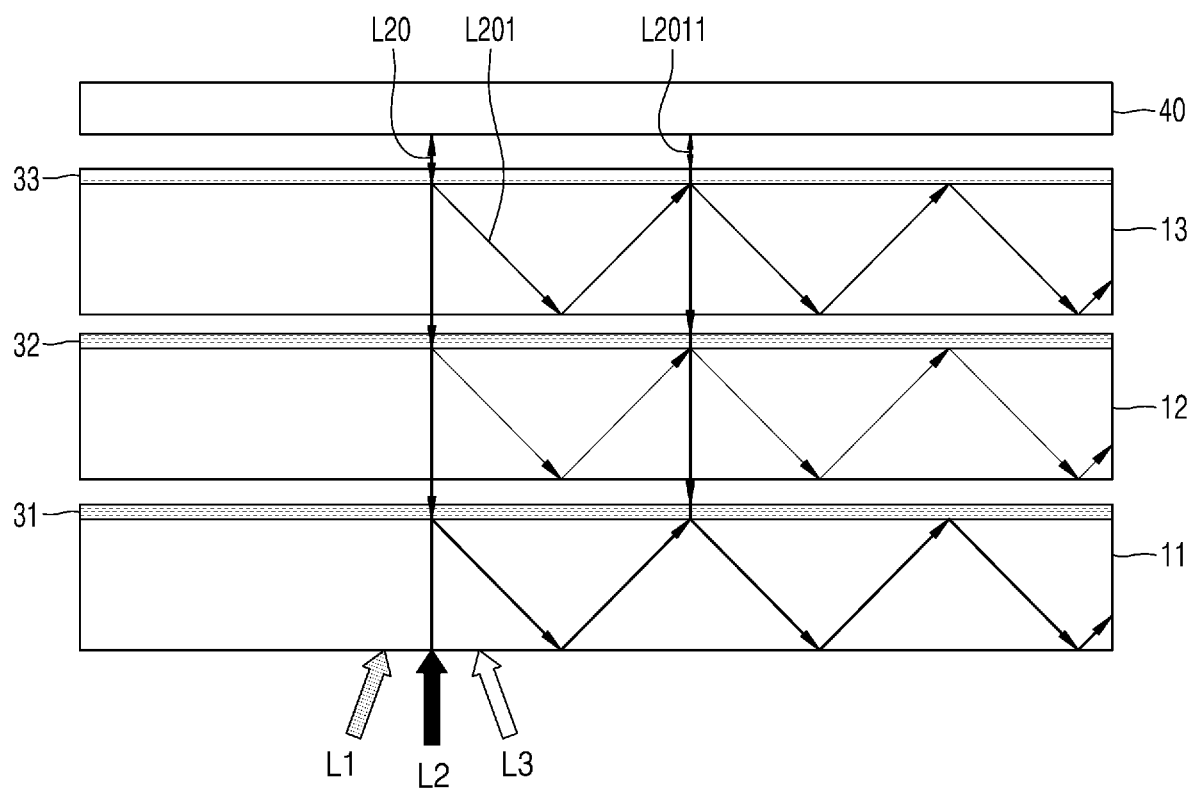
FIG. 13 is a diagram illustrating an operation of the waveguide of FIG. 11.

FIG. 13 illustrates an optical path of a zero order diffraction light among optical paths of the second light L2. Referring to FIG. 13, the second light L2 is incident on the first waveguide layer 11 and then, diffracted as a zero order diffraction light, a first order diffraction light, etc. by the first sub-input coupling element 31. Among these lights, the zero order diffraction light L20 travels as it is without bending its traveling direction in the first sub-input coupling element 31 and is incident into the second waveguide layer 12. Thereafter, the zero order diffraction light L20 is diffracted once again (second order) by the second sub-input coupling element 32, and among these lights, the zero order diffraction light L20 is incident into the third waveguide layer 13, and then, diffracted twice again (third order) by the third sub-input coupling element 33. As a result, among the lights diffracted twice again (third order) by the third sub-input coupling element 33, the zero order diffraction light L20 is directed toward the reflective element 40, is reflected by the reflective element 40, and is incident back on the sub-input coupling element 33. The third sub-input coupling element 33 diffracts back the zero order diffraction light L20 reflected by the reflective element 40, so that among these lights, the first order diffraction light L201 is totally internally reflected and propagates in the third waveguide layer 13. In the same manner, the zero order diffraction light has an additional diffraction opportunity in the first and second sub-input coupling elements 31 and 32, and thus, light efficiency may be increased. Furthermore, part L2011 of the diffraction light totally internally reflected in such a path is firstly diffracted back by the first to third sub-input coupling elements 31, 32, and 33, and escapes from the first to third waveguide layers 11, 12 and 13. The reflective element 40 again inputs back these lights L2011 back to the first to third waveguide layers 11, 12 and 13, thereby increasing light efficiency.

Figure 14:
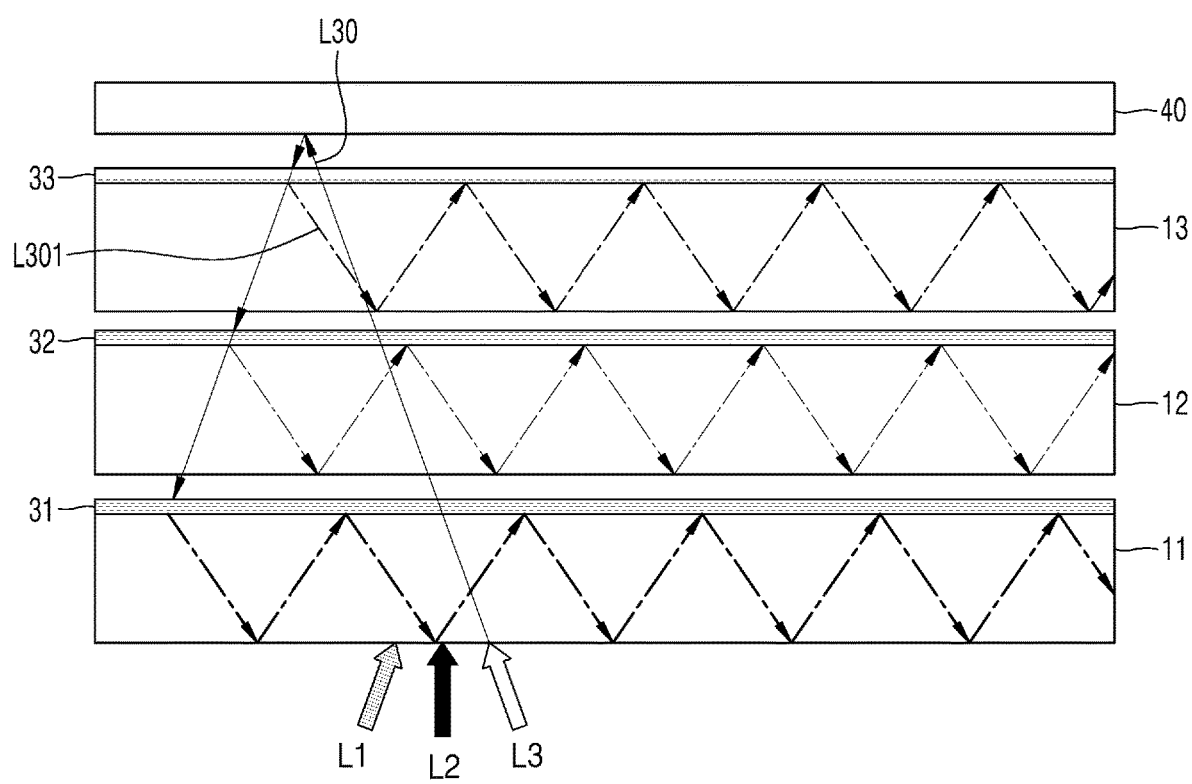
FIG. 14 is a diagram illustrating the operation of the waveguide of FIG. 11.

FIG. 14 illustrates a path of the third light L3 in a zero order diffraction light generated by the first sub-input coupling element 31. Referring to FIG. 14, the third light L3 is incident on the first waveguide layer 11 and then diffracted by the first sub-input coupling element 31 as a zero order diffraction light, a first order diffraction light, etc., among these lights, the zero order diffraction light L30 is diffracted once again (second order) by the second sub-input coupling element 32, and, among the second order diffraction lights, the zero order diffraction light L30 is diffracted twice again (third order) by the third input-coupling element 33. As a result, among the diffraction lights diffracted twice again (third order) by the third input-coupling element 33, the zero order diffraction light L30 is directed toward the reflective element 40, is reflected by the reflective element 40, and is directed back toward the third sub-input coupling element 33. Thereafter, the first to third sub-input coupling elements 31, 32, and 33 diffract back the zero order diffraction light L30 reflected by the reflective element 40, so that, among these lights, the first order diffraction light L301 propagates in the first to third waveguide layers 11, 12, and 13, thereby increasing light efficiency. Further, part of the diffraction light L301 totally internally reflected in such a path is firstly diffracted back by the first to third sub-input coupling elements 31, 32, and 33, and escapes from the first to third waveguide layers 11, 12, and 13. The reflective element 40 again inputs these lights back to the first to third waveguide layers 11, 12, and 13, thereby increasing light efficiency.

Figure 15:
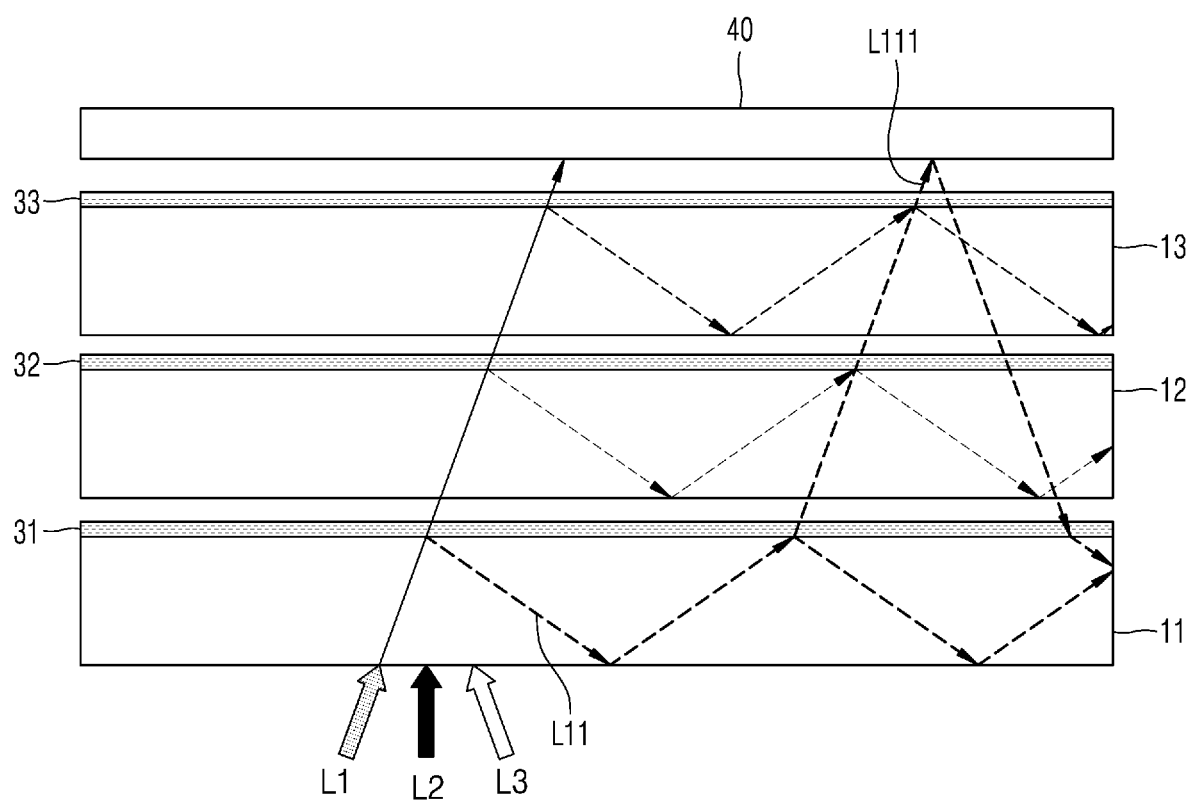
FIG. 15 is a diagram illustrating an operation of the waveguide of FIG. 11.
Figure 16:
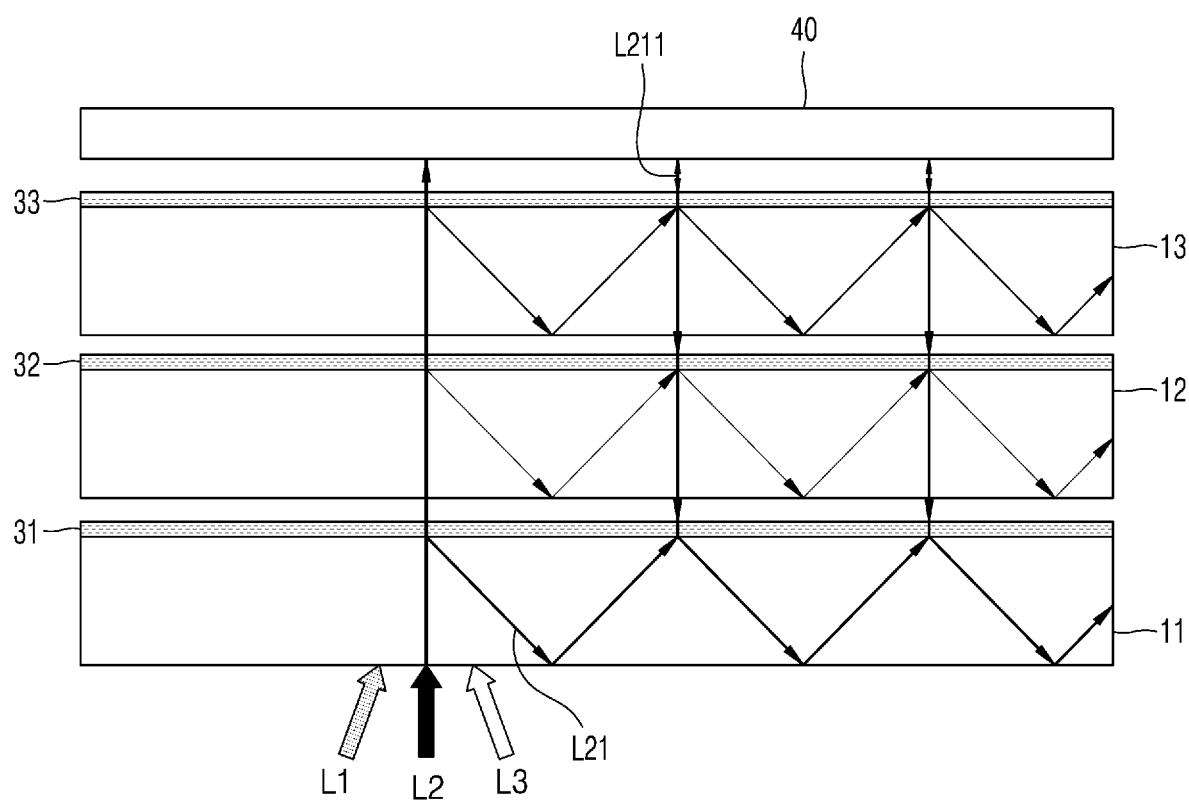
FIG. 16 is a diagram illustrating an operation of the waveguide of FIG. 11.
Figure 17:
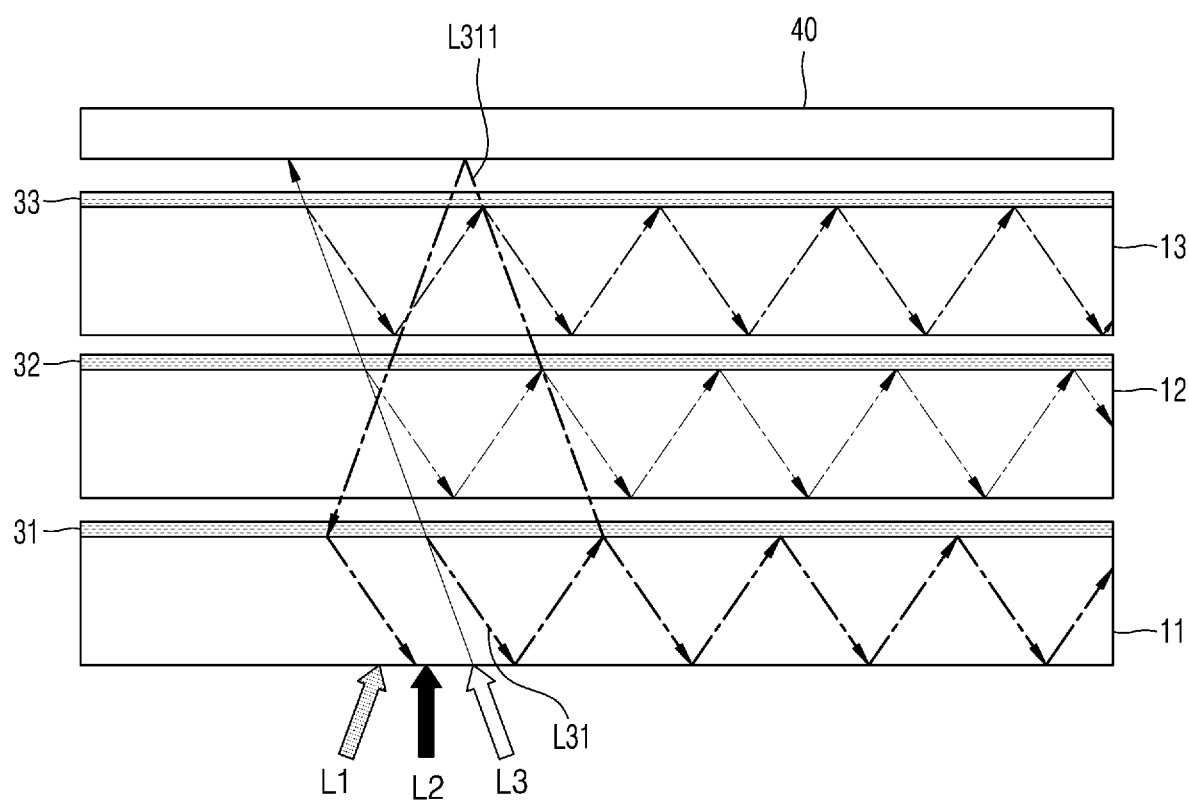
FIG. 17 is a diagram illustrating an operation of the waveguide of FIG. 11.

FIGS. 15 to 17 illustrate paths of first order diffraction lights of the first to third lights L1, L2, and L3 generated by the first to third sub-input coupling elements 31, 32, and 33.

Referring to FIGS. 15 to 17, the first to third lights L1, L2, and L3 are incident on the first waveguide layer 11 and then diffracted by the first sub-input coupling element 31 as a zero order diffraction light, a first order diffraction light, etc., among these lights, the first diffraction lights L11, L21, and L31 are totally internally reflected and propagate in the first waveguide layer 11, and the zero order diffraction light travels to the second waveguide layer 12. The zero order diffraction light traveling to the second waveguide layer 12 is diffracted once again (second order) by the second sub-input coupling element 32, among the second order diffraction lights, the first order diffraction light is totally internally reflected and propagates in the second waveguide layer 12, and, among the second order diffracted diffraction lights, the zero order diffraction light travels to the third waveguide layer 13. The zero order diffraction light traveling to the third waveguide layer 13 is diffracted twice again (third order) by the third sub-input coupling element 33 and, among the diffraction lights diffracted twice again (third order), the first order diffraction light is totally internally reflected and propagates in the third waveguide layer 13. Meanwhile, some lights L111, L211, and L311 of the totally internally reflected diffraction lights are firstly diffracted back by the first to third sub-input coupling elements 31, 32, and 33, and escape from the first to third waveguide layers 11, 12, and 13. The reflective element 40 again inputs these lights L111, L211, and L311 back to the first to third waveguide layers 11, 12, 13, thereby increasing light efficiency.

In FIGS. 12 to 17, a traveling direction of the first light that is firstly diffracted in the first waveguide layer 11, a traveling direction of the first light that is firstly diffracted in the second waveguide layer 12, and a traveling direction of the first light that is firstly diffracted in the third waveguide layer 13 are all the same, but the disclosure is not limited thereto. For example, lattice vectors of the first to third sub-input coupling elements 31, 32, and 33 may be different from each other, and accordingly, the traveling direction of the first light that is firstly diffracted in the first waveguide layer 11, the traveling direction of the first light that is firstly diffracted in the second waveguide layer 12, and the traveling direction of the first light that is firstly diffracted in the third waveguide layer 13 may be different from each other. For the same reason, traveling directions of the second lights that are firstly diffracted may be different from each other in the first to third waveguide layers 11, 12, and 13, and traveling directions of the third lights that are firstly diffracted may also be different from each other in the first to third waveguide layers 11, 12, and 13.

Figure 18:
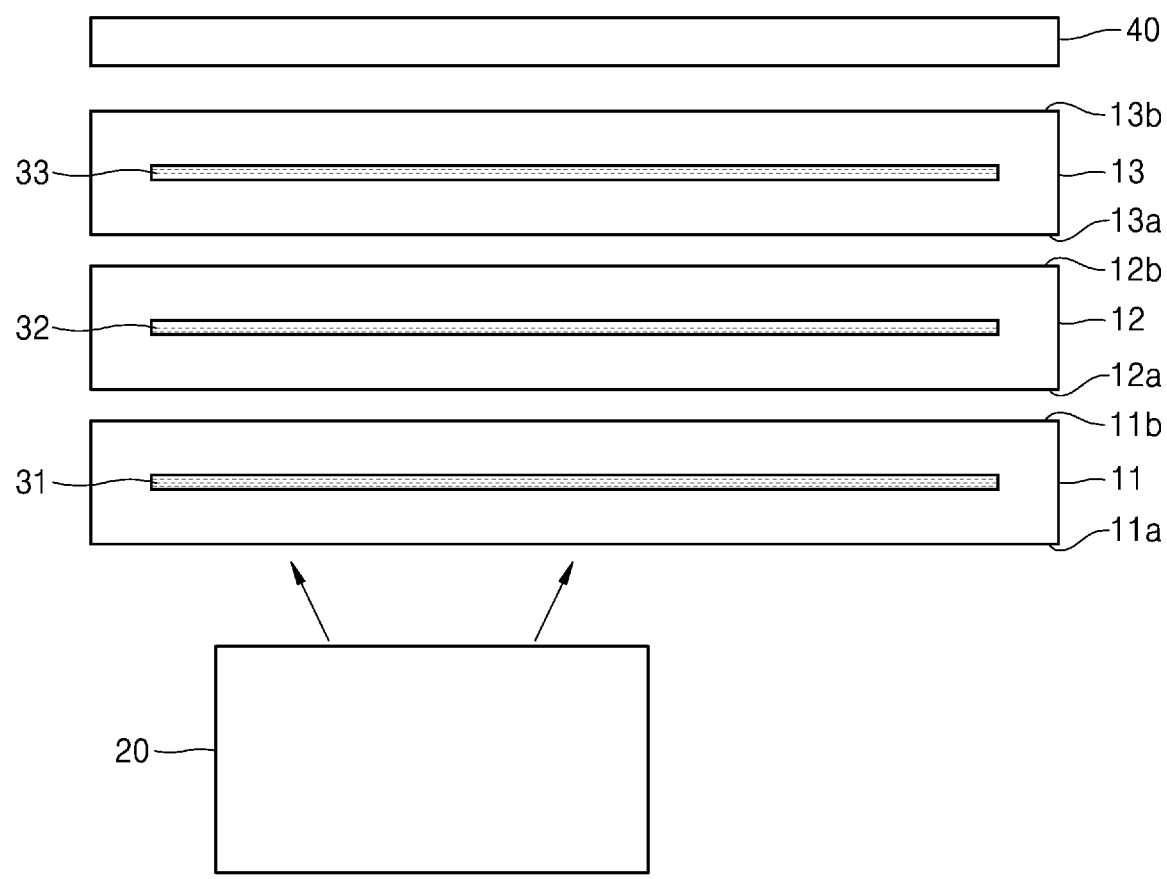
FIG. 18 schematically illustrates a waveguide according to an embodiment of the disclosure.

FIG. 18 schematically illustrates a waveguide according to an embodiment of the disclosure. The embodiment of the disclosure is substantially the same as the waveguide of the embodiment described with reference to FIGS. 11 to 17, except for positions of the first to third sub-input coupling elements 31, 32, and 33 of an input-coupling element.

Referring to FIG. 18, the first to third sub-input coupling elements 31, 32, and 33 of the input-coupling element may be provided inside the first to third waveguide layers 11, 12 and 13, respectively. In FIG. 18, the reflective element 40 is spaced apart from the second side 13b of the third waveguide layer 13, but the reflective element 40 may be attached to the second side 13b of the third waveguide layer 13.

Figure 19:
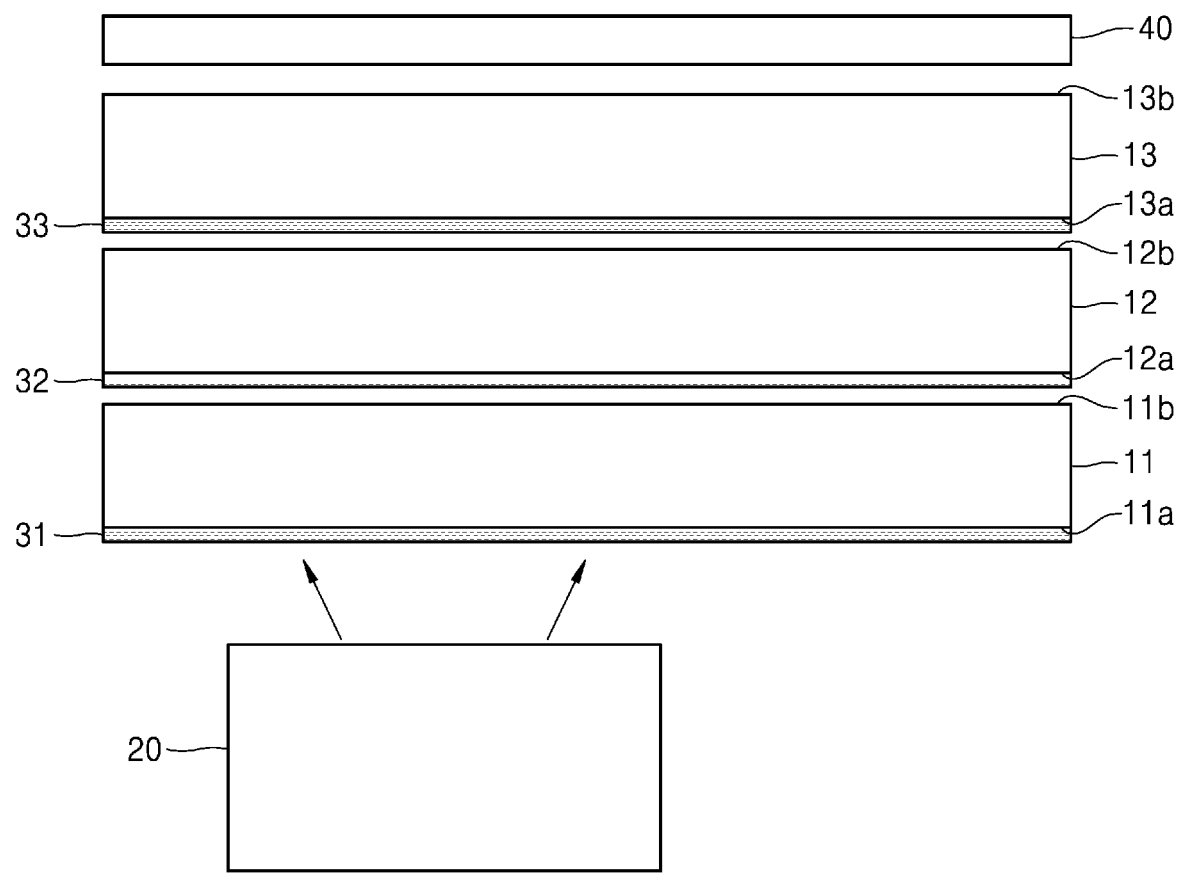
FIG. 19 schematically illustrates a waveguide according to an embodiment of the disclosure.

FIG. 19 schematically illustrates a waveguide according to an embodiment of the disclosure. The embodiment of the disclosure is substantially the same as the waveguide of the embodiment described with reference to FIGS. 11 to 17, except for positions of the first to third sub-input coupling elements 31, 32, and 33 of an input-coupling element. Referring to FIG. 19, the first to third sub-input coupling elements 31, 32 and 33 of the input-coupling element may be provided on sides (i.e., the first sides 11a, 12a, and 13a of the first to third waveguide layers 11, 12, and 13, respectively) closer to the display engine 20 of the first to third waveguide layers 11, 12 and 13, respectively. The first to third sub-input coupling elements 31, 32, and 33 may be etched in or attached to or coated on the first to third waveguide layers 11, 12 and 13, respectively, but are not limited thereto.

In the embodiments of the disclosure described with reference to FIGS. 11 to 19, the number of sub-input coupling elements is the same as the number of waveguide layers, but is not limited thereto. The number of sub-input coupling elements may be greater than the number of waveguide layers.

Figure 20:
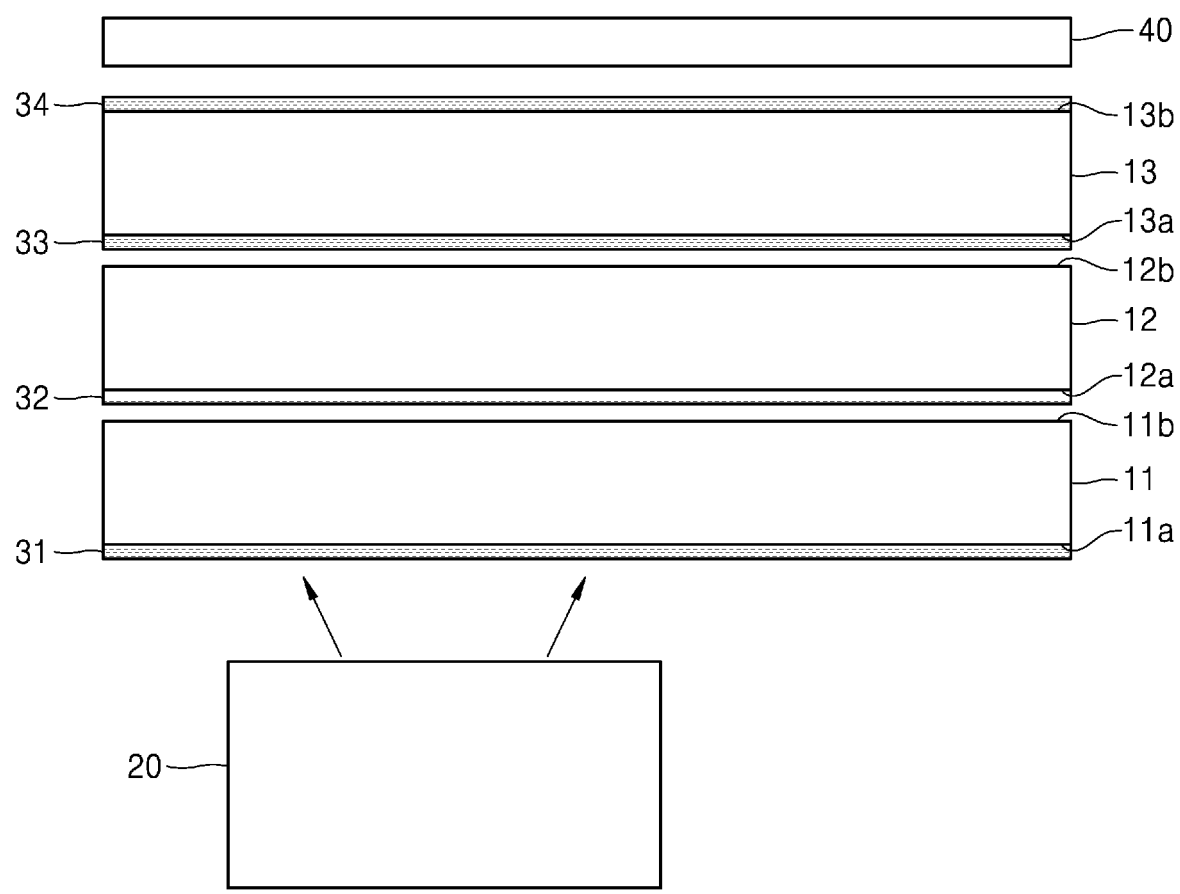
FIG. 20 schematically illustrates a waveguide according to an embodiment of the disclosure.

FIG. 20 schematically illustrates a waveguide according to an embodiment of the disclosure. The embodiment of the disclosure is substantially the same as the waveguide of the embodiment described with reference to FIG. 19, except that an input-coupling element further includes a fourth sub-input coupling element 34. Referring to FIG. 20, the input-coupling element includes the first to fourth sub-input coupling elements 31, 32, 33, and 34. The first to third sub-input coupling elements 31, 32, and 33 are provided on sides (i.e., the first sides 11a, 12a, and 13a of the first to third waveguide layers 11, 12, and 13, respectively) closer to the display engine 20 of the first to third waveguide layers 11, 12 and 13, respectively, and the fourth sub-input coupling element 34 is provided on the second side 13b of the third waveguide layer 13. The third and fourth sub-input coupling elements 33 and 34 respectively provided on the first and second sides 13a and 13b of the third waveguide layer 13 may have different lattice characteristics such as a lattice vector.

In FIG. 20, the sub-input coupling elements are provided on the first and second sides 13a and 13b of the third waveguide layer 13, respectively, but the sub-input coupling elements may be provided on both sides of the first waveguide layer 11 or provided on both sides of the second waveguide layer 12.

In the embodiments of the disclosure described with reference to FIGS. 11 to 20, an example in which each of the sub-input coupling elements is a single layer has been described, but similarly to the embodiment of the disclosure described with reference to FIG. 10, the sub-input coupling elements may be configured by stacking a plurality of layers having different lattice characteristics.

In the embodiments of the disclosure described with reference to FIGS. 11 to 20, an example in which the waveguide includes three layers has been described, but the waveguide may include two layers or four or more layers. As described above, as the waveguide is configured in multiple layers, the range of an incidence angle allowed at the entrance pupil of the waveguide may be increased, and accordingly, the viewing angle of the waveguide may be increased.

Figure 21:
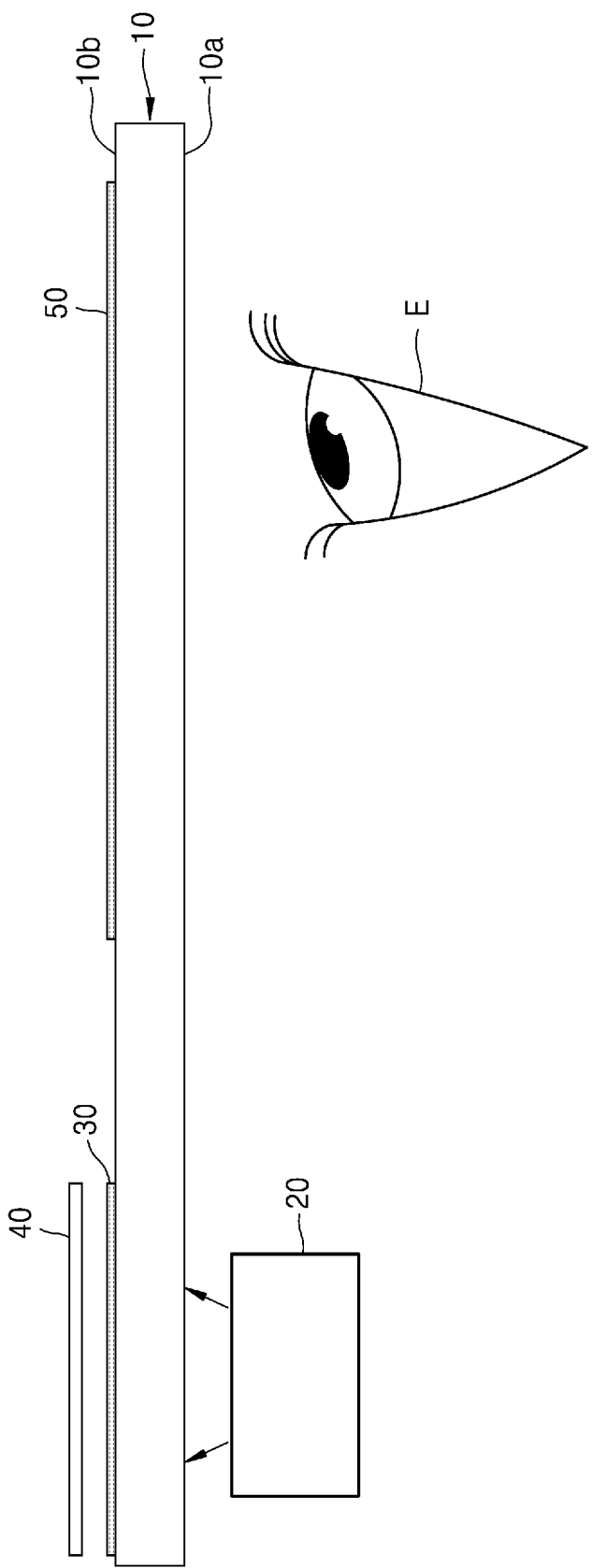
FIG. 21 schematically illustrates an augmented reality (AR) device according to an embodiment of the disclosure.

FIG. 21 is a diagram schematically illustrating an augmented reality device according to an embodiment of the disclosure.

Referring to FIG. 21, the augmented reality device according to an embodiment of the disclosure may include the waveguide 10 according to the embodiments described above. The waveguide 10 may include an input-coupling element 30 and an output-coupling element 50. The output-coupling element 50 is provided on a second side 10b of the waveguide 10, but the output-coupling element 50 may be provided on a first side 10a of the waveguide 10 or may be provided on both sides (i.e., the first and second sides 10a and 10b) of the waveguide 10. The waveguide 10 may further include an expanding element for pupil expansion of an input light. The expanding element may be positioned between the input-coupling element 30 and the output-coupling element 50 or may overlap the output-coupling element 50 in a partial region or in the same region. The output-coupling element 50 or the expanding element may be a diffractive element or a meta element. The diffractive element may include, a diffractive optical element (DOE), a holographic optical element (HOE), a volume holographic optical element (VHOE), or a surface relief lattice (SRG), but is not limited thereto. The meta element is an element having a metasurface structured in a pattern in which an incident light is smaller than a wavelength band (i.e., a subwavelength), for example, a metalattice or metalens having the pattern in which the incident light is smaller than the wavelength band, but is not limited thereto.

The augmented reality device may further include a display engine 20 that projects light of an image (e.g., a virtual object). The light projected by the display engine 20 is output to a target region through the waveguide 10. The target region may be a user's eye motion box (EMB).

Information processing and image formation for the display engine 20 may be performed directly by a computer of the augmented reality device itself, or an external electronic device, such as a smart phone, tablet, computer, notebook, and all other intelligent (smart) devices, to which the augmented reality device is connected. Signal transmission between the augmented reality device and the external electronic device may be performed through wired communication and/or wireless communication. The AR device may receive power from at least one of a built-in power source (rechargeable battery), an external device, or an external power source.

As described above, the waveguide 10 may use the reflective element 40 to improve the use efficiency of light, and accordingly, the size and thickness of the waveguide 10 may be reduced, and therefore, the AR device may improve the brightness of a displayed image, make the size of the device itself compact, and reduce the power consumption of the display engine 20.

In the disclosure, an augmented reality (AR) device is an apparatus capable of expressing augmented reality, and may include not only a glasses-shaped device worn by the user on the face, but also a head mounted display (HMD), an AR helmet, and a head up display (HUD) that are worn on the head.

Figure 22:
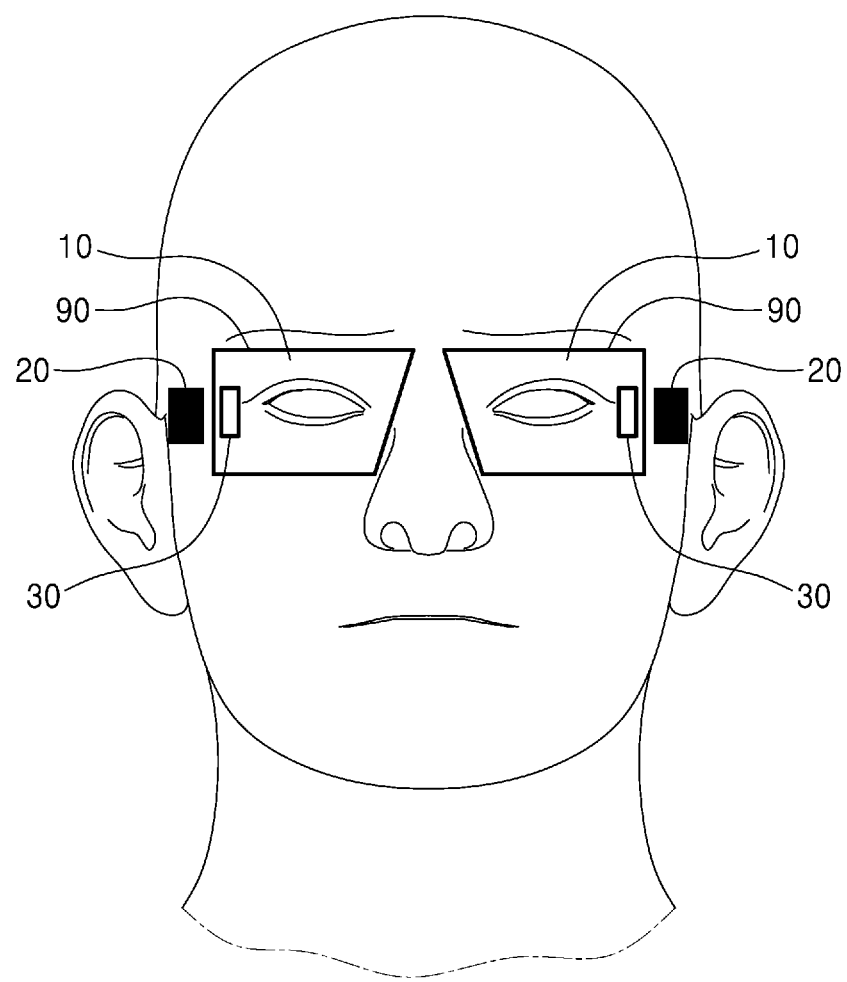
FIG. 22 schematically illustrates AR glasses according to an embodiment of the disclosure.

FIG. 22 is a diagram schematically illustrating AR glasses according to an embodiment of the disclosure. Referring to FIG. 22, the AR glasses may use the near-eye display apparatus described with reference to FIG. 21 as a left eye element and a right eye element instead of a lens. That is, the AR glasses may include the waveguide 10 and the display engine 20 according to the embodiments of the disclosure described above for each of the left eye element and the right eye element. The waveguide 10 is fixed to a frame 90. The display engine 20 is positioned near the temple of the user's head and fixed to the frame 90. The waveguide 10 includes the input-coupling element 30 for inputting light from the display engine 20 to the waveguide 10. The waveguide 10 is arranged so that a region having the output-coupling element 50 (FIG. 21) is positioned opposite to the corresponding user's (wearer) eye. The display engine 20 is positioned opposite to the input-coupling element 30.

In the disclosure, while an example in which the waveguide 10 is applied to the AR device has been described, it will be obviously understood by those of ordinary skill in the art that the waveguide 10 may be applied to a near-eye display and a head-up display (HUD) apparatus including a virtual reality device capable of expressing virtual reality.

While the waveguide and the AR device employing the same according to the disclosure have been shown and described with reference to the embodiment of the disclosure illustrated in the drawings to help understanding, this is merely an example and those of ordinary skill in the art would understand that various modifications and equivalent embodiments of the disclosure may be possible therefrom. Therefore, the true technical scope of the disclosure should be defined by the appended claims.

What is claimed is:

1. A waveguide comprising:
   a waveguide body comprising a first side on which a light is incident and a second side opposite to the first side, wherein the waveguide body comprises a plurality of waveguide layers including a first waveguide layer having a first side and a second side, a second waveguide layer having a first side and a second side and a third waveguide layer having a first side and a second side, and the light is incident on the first side of the first waveguide layer, the second side of the first waveguide layer faces the first side of the second waveguide layer, the second side of the second waveguide layer faces the first side of the third second waveguide layer;

an input-coupling element inputting one portion of the light into the waveguide body;

a reflective element disposed at the second side of the waveguide body and inputting another portion of the light, into the waveguide body; and an output-coupling element outputting a light propagating inside the waveguide body to an outside, wherein the input-coupling element comprises sub-input coupling elements, wherein the sub-input coupling elements include a first layer disposed on the first side of the first waveguide layer, a second layer disposed on the first side of the second waveguide layer, a third layer disposed on the first side of the third waveguide layer, and a fourth layer disposed on the second side of the third waveguide layer, wherein the fourth layer of the sub-input coupling elements faces the reflective element, and wherein lattice characteristics of the first layer, the second layer, the third layer and the fourth layer of the sub-input coupling elements are different from each other.

2. The waveguide of claim 1, wherein the reflective element further reflects a zero order diffracted light generated by the input-coupling element, to the input-coupling element, and the input-coupling element further diffracts the zero order diffraction light reflected by the reflective element and again inputs the zero order diffraction light into the waveguide body.

3. The waveguide of claim 1, wherein a number of the sub-input coupling elements is equal to or greater than a number of the plurality of waveguide layers.

4. The waveguide of claim 1, wherein the reflective element comprises any one selected from the group consisting of a metal, a dielectric, a polymer, a polarization-dependent element, a meta element, a hologram, and a dichroic mirror.

5. The waveguide of claim 1, wherein the reflective element is attached to, coated on, or spaced apart from the second side of the waveguide body.

6. The waveguide of claim 1, wherein the input-coupling element comprises a diffractive element or a meta element.

7. The waveguide of claim 1, wherein the output-coupling element comprises a diffractive element or a meta element.

8. The waveguide of claim 1, further comprising an expanding element expanding the light propagating inside the waveguide body.

9. Augmented reality (AR) glasses comprising:
a left eye element; and
a right eye element, wherein each of the left eye element and the right eye element comprises a display engine and the waveguide of claim 1, the display engine being configured to emit light of an image, and the waveguide is disposed in each of the left eye element and the right eye element so that an output-coupling element outputting the light emitted from the display engine is disposed opposite to a region comprising a user's eye.

10. An augmented reality (AR) device comprising:
a display engine configured to emit a light of an image; and
a waveguide comprising:
a waveguide body comprising a first side on which the light is incident and a second side opposite to the first side, wherein the waveguide body comprises a plurality of waveguide layers including a first waveguide layer having a first side and a second side, a second waveguide layer having a first side and a second side and a third waveguide layer having a first side and a second side, and the light is incident on the first side of the first waveguide layer, the second side of the first waveguide layer faces the first side of the second waveguide layer, the second side of the second waveguide layer faces the first side of the third second waveguide layer;

an input-coupling element inputting one portion of the light into the waveguide body;

a reflective element disposed at the second side of the waveguide body and inputting another portion of the light into the waveguide body; and an output-coupling element outputting a light propagating inside the waveguide body to an outside, wherein the display engine is disposed opposite to the first side of the waveguide, and the waveguide guides the light emitted from the display engine to a target region, the target region being a user's eye motion box (EMB), and wherein the input-coupling element comprises sub-input coupling elements, wherein the sub-input coupling elements include a first layer disposed on the first side of the first waveguide layer, a second layer disposed on the first side of the second waveguide layer, a third layer disposed on the first side of the third waveguide layer, and a fourth layer disposed on the second side of the third waveguide layer, wherein the fourth layer of the sub-input coupling elements faces the reflective element, and wherein lattice characteristics of the first layer, the second layer, the third layer and the fourth layer of the sub-input coupling elements are different from each other.

\* \* \* \* \*